US012620179B2

(12) United States Patent
Herman et al.

(10) Patent No.: US 12,620,179 B2
(45) Date of Patent: May 5, 2026

(54) DIGITAL ASSISTANT OBJECT PLACEMENT

(71) Applicant: Apple Inc., Cupertino, CA (US)

(72) Inventors: Brad K. Herman, Culver City, CA
(US); Garrett L. Weinberg, Santa
Cruz, CA (US); Isar Arason, Lilburn,
GA (US); Pedro Mari, Santa Cruz, CA
(US); Shiraz Akmal, Playa Vista, CA
(US); Stephen O. Lemay, Palo Alto,
CA (US); James J. Owen, San
Francisco, CA (US); **Miquel Estany
Rodriguez**, San Francisco, CA (US);
Jay Moon, San Francisco, CA (US);
William A. Sorrentino, III, Mill
Valley, CA (US); **Jose Antonio Checa
Oloriz, San Francisco, CA (US); Lynn
I. Streja**, San Francisco, CA (US)

(73) Assignee: Apple Inc., Cupertino, CA (US)

( * ) Notice: Subject to any disclaimer, the term of this
patent is extended or adjusted under 35
U.S.C. 154(b) by 61 days.

(21) Appl. No.: 18/434,605

(22) Filed: Feb. 6, 2024

(65) Prior Publication Data

US 2024/0177424 A1 May 30, 2024

Related U.S. Application Data

(63) Continuation of application No.
PCT/US2022/040346, filed on Aug. 15, 2022.
(Continued)

(51) Int. Cl.
*G06T 19/00* (2011.01)
*G06F 3/00* (2006.01)
(Continued)

(52) U.S. Cl.
CPC .............. *G06T 19/00* (2013.01); *G06F 3/013*
(2013.01); *G06F 3/016* (2013.01); *G06F*
*3/017* (2013.01); *G10L 15/22* (2013.01)

(58) Field of Classification Search
CPC ..... G06T 19/00; G06T 19/003; G06T 19/006;
G06F 3/011; G06F 3/012; G06F 3/013;
(Continued)

(56) References Cited

U.S. PATENT DOCUMENTS

| 7,539,656 B2 | 5/2009 | Fratkina et al. |
| 8,296,383 B2 | 10/2012 | Lindahl |

(Continued)

FOREIGN PATENT DOCUMENTS

| CN | 104699746 A | 6/2015 |
| JP | 2018-139143 A | 9/2018 |

(Continued)

OTHER PUBLICATIONS

International Preliminary Report on Patentability received for PCT
Patent Application No. PCT/US2022/040346, mailed on Feb. 29,
2024, 10 pages.
(Continued)

*Primary Examiner* — Vijay SHankar
(74) *Attorney, Agent, or Firm* — YHE Law LLP

(57) ABSTRACT

Systems and processes for operating an intelligent auto-
mated assistant within a computer-generated reality (CGR)
environment are provided. For example, a user input invok-
ing a digital assistant session is received, and in response, a
digital assistant session is initiated. Initiating the digital
assistant session includes positioning a digital assistant
object at a first location within the CGR environment but
outside of the currently-displayed portion of the CGR envi-
ronment at a first time, and providing a first output indicating
the location of the digital assistant object.

36 Claims, 17 Drawing Sheets

Related U.S. Application Data

(60) Provisional application No. 63/247,557, filed on Sep. 23, 2021, provisional application No. 63/235,424, filed on Aug. 20, 2021.

(51) Int. Cl.
*G06F 3/01* (2006.01)
*G10L 15/22* (2006.01)

(58) Field of Classification Search
CPC .......... G06F 3/016; G06F 3/017; G06F 3/167; G10L 15/22; G02B 2027/0178
See application file for complete search history.

(56) References Cited

U.S. PATENT DOCUMENTS

| | | | |
|---|---|---|---|
| 8,311,838 B2 | 11/2012 | Lindahl et al. | |
| 8,345,665 B2 | 1/2013 | Vieri et al. | |
| 8,352,268 B2 | 1/2013 | Naik et al. | |
| 8,352,272 B2 | 1/2013 | Rogers et al. | |
| 8,355,919 B2 | 1/2013 | Silverman et al. | |
| 8,380,507 B2 | 2/2013 | Herman et al. | |
| 8,396,714 B2 | 3/2013 | Rogers et al. | |
| 8,600,743 B2 | 12/2013 | Lindahl et al. | |
| 8,620,662 B2 | 12/2013 | Bellegarda | |
| 8,639,516 B2 | 1/2014 | Lindahl et al. | |
| 8,645,137 B2 | 2/2014 | Bellegarda et al. | |
| 8,660,849 B2 | 2/2014 | Gruber et al. | |
| 8,670,979 B2 | 3/2014 | Gruber et al. | |
| 8,676,904 B2 | 3/2014 | Lindahl | |
| 8,677,377 B2 | 3/2014 | Cheyer et al. | |
| 8,682,667 B2 | 3/2014 | Haughay | |
| 8,688,446 B2 | 4/2014 | Yanagihara | |
| 8,706,472 B2 | 4/2014 | Ramerth et al. | |
| 8,706,503 B2 | 4/2014 | Cheyer et al. | |
| 8,713,119 B2 | 4/2014 | Lindahl et al. | |
| 8,719,006 B2 | 5/2014 | Bellegarda | |
| 8,719,014 B2 | 5/2014 | Wagner | |
| 8,731,942 B2 | 5/2014 | Cheyer et al. | |
| 8,762,156 B2 | 6/2014 | Chen | |
| 8,762,469 B2 | 6/2014 | Lindahl | |
| 8,768,702 B2 | 7/2014 | Mason et al. | |
| 8,799,000 B2 | 8/2014 | Guzzoni et al. | |
| 8,862,252 B2 | 10/2014 | Rottler et al. | |
| 8,892,446 B2 | 11/2014 | Cheyer et al. | |
| 8,898,568 B2 | 11/2014 | Bull et al. | |
| 8,930,191 B2 | 1/2015 | Gruber et al. | |
| 8,977,255 B2 | 3/2015 | Freeman et al. | |
| 8,996,376 B2 | 3/2015 | Fleizach et al. | |
| 9,101,279 B2 | 8/2015 | Ritchey et al. | |
| 9,117,447 B2 | 8/2015 | Gruber et al. | |
| 9,129,430 B2 * | 9/2015 | Salter .................... G06T 19/006 | |
| 9,245,388 B2 | 1/2016 | Poulos et al. | |
| 9,262,612 B2 | 2/2016 | Cheyer | |
| 9,318,108 B2 | 4/2016 | Gruber et al. | |
| 9,330,720 B2 | 5/2016 | Lee | |
| 9,338,493 B2 | 5/2016 | Van Os et al. | |
| 9,368,114 B2 | 6/2016 | Larson et al. | |
| 9,548,050 B2 | 1/2017 | Gruber et al. | |
| 9,606,986 B2 | 3/2017 | Bellegarda | |
| 9,626,955 B2 | 4/2017 | Fleizach et al. | |
| 9,633,004 B2 | 4/2017 | Giuli et al. | |
| 9,633,660 B2 | 4/2017 | Haughay | |
| 9,633,674 B2 | 4/2017 | Sinha | |
| 9,668,121 B2 | 5/2017 | Naik et al. | |
| 9,697,822 B1 | 7/2017 | Naik et al. | |
| 9,715,875 B2 | 7/2017 | Piernot et al. | |
| 9,721,566 B2 | 8/2017 | Newendorp et al. | |
| 9,818,400 B2 | 11/2017 | Paulik et al. | |
| 9,858,925 B2 | 1/2018 | Gruber et al. | |
| 9,886,953 B2 | 2/2018 | Lemay et al. | |
| 9,922,642 B2 | 3/2018 | Pitschel et al. | |
| 9,966,065 B2 | 5/2018 | Gruber et al. | |
| 9,966,068 B2 | 5/2018 | Cash et al. | |
| 9,972,304 B2 | 5/2018 | Paulik et al. | |
| 9,978,180 B2 | 5/2018 | Margolis et al. | |
| 9,986,419 B2 | 5/2018 | Naik et al. | |
| 10,048,748 B2 | 8/2018 | Sridharan et al. | |
| 10,049,663 B2 | 8/2018 | Orr et al. | |
| 10,049,668 B2 | 8/2018 | Huang et al. | |
| 10,074,360 B2 | 9/2018 | Kim | |
| 10,078,487 B2 | 9/2018 | Gruber et al. | |
| 10,083,688 B2 | 9/2018 | Piernot et al. | |
| 10,083,690 B2 | 9/2018 | Giuli et al. | |
| 10,089,072 B2 | 10/2018 | Piersol et al. | |
| 10,102,359 B2 | 10/2018 | Cheyer | |
| 10,169,329 B2 | 1/2019 | Futrell et al. | |
| 10,170,123 B2 | 1/2019 | Orr et al. | |
| 10,176,167 B2 | 1/2019 | Evermann | |
| 10,176,808 B1 | 1/2019 | Lovitt et al. | |
| 10,180,572 B2 | 1/2019 | Osterhout et al. | |
| 10,185,542 B2 | 1/2019 | Carson et al. | |
| 10,186,254 B2 | 1/2019 | Williams et al. | |
| 10,192,552 B2 | 1/2019 | Raitio et al. | |
| 10,199,051 B2 | 2/2019 | Binder et al. | |
| 10,223,066 B2 | 3/2019 | Martel et al. | |
| 10,241,644 B2 | 3/2019 | Gruber et al. | |
| 10,249,300 B2 | 4/2019 | Booker et al. | |
| 10,269,345 B2 | 4/2019 | Castillo Sanchez et al. | |
| 10,296,160 B2 | 5/2019 | Shah et al. | |
| 10,297,253 B2 | 5/2019 | Walker, II et al. | |
| 10,311,871 B2 | 6/2019 | Newendorp et al. | |
| 10,417,037 B2 | 9/2019 | Gruber et al. | |
| 10,475,446 B2 | 11/2019 | Gruber et al. | |
| 10,489,651 B2 | 11/2019 | Luccin et al. | |
| 10,497,365 B2 | 12/2019 | Gruber et al. | |
| 10,540,976 B2 | 1/2020 | Van Os et al. | |
| 10,568,032 B2 | 2/2020 | Freeman et al. | |
| 10,571,715 B2 | 2/2020 | Rizzo et al. | |
| 10,585,957 B2 | 3/2020 | Heck et al. | |
| 10,642,934 B2 | 5/2020 | Heck et al. | |
| 10,643,611 B2 | 5/2020 | Lindahl | |
| 10,652,394 B2 | 5/2020 | Van Os et al. | |
| 10,659,851 B2 | 5/2020 | Lister et al. | |
| 10,671,428 B2 | 6/2020 | Zeitlin | |
| 10,691,473 B2 | 6/2020 | Karashchuk et al. | |
| 10,706,841 B2 | 7/2020 | Gruber et al. | |
| 10,747,498 B2 | 8/2020 | Stasior et al. | |
| 10,748,529 B1 | 8/2020 | Milden | |
| 10,791,176 B2 | 9/2020 | Phipps et al. | |
| 10,802,843 B1 | 10/2020 | Carrigan et al. | |
| 10,978,090 B2 | 4/2021 | Binder et al. | |
| 11,080,336 B2 | 8/2021 | Van Dusen | |
| 11,087,759 B2 | 8/2021 | Lemay et al. | |
| 11,133,008 B2 | 9/2021 | Piernot et al. | |
| 11,151,899 B2 | 10/2021 | Pitschel et al. | |
| 11,152,002 B2 | 10/2021 | Walker et al. | |
| 11,176,757 B2 * | 11/2021 | Whitney ................ G06T 13/00 | |
| 11,200,028 B2 * | 12/2021 | Newell ................... G06F 3/167 | |
| 11,348,582 B2 | 5/2022 | Lindahl | |
| 11,388,291 B2 | 7/2022 | Van Os et al. | |
| 11,538,469 B2 | 12/2022 | Acero et al. | |
| 11,615,598 B2 * | 3/2023 | Whitney ................ G06T 13/00 345/633 | |
| 11,630,525 B2 | 4/2023 | Hindi et al. | |
| 11,935,205 B2 * | 3/2024 | Whitney ............ G02B 27/0093 | |
| 2013/0204813 A1 | 8/2013 | Master et al. | |
| 2013/0346068 A1 | 12/2013 | Solem et al. | |
| 2014/0310595 A1 | 10/2014 | Acharya et al. | |
| 2014/0375683 A1 | 12/2014 | Salter et al. | |
| 2015/0162000 A1 | 6/2015 | Di Censo et al. | |
| 2015/0317831 A1 | 11/2015 | Ebstyne et al. | |
| 2015/0317832 A1 | 11/2015 | Ebstyne et al. | |
| 2016/0105308 A1 | 4/2016 | Dutt | |
| 2017/0337035 A1 | 11/2017 | Choudhary et al. | |
| 2018/0121432 A1 | 5/2018 | Parson et al. | |
| 2018/0225131 A1 | 8/2018 | Tommy et al. | |
| 2018/0232608 A1 | 8/2018 | Pradeep et al. | |
| 2018/0366118 A1 | 12/2018 | Lovitt et al. | |
| 2019/0025906 A1 | 1/2019 | Strong et al. | |
| 2019/0026936 A1 | 1/2019 | Gorur Sheshagiri et al. | |
| 2019/0279618 A1 | 9/2019 | Yadav et al. | |
| 2019/0332400 A1 | 10/2019 | Spoor et al. | |
| 2020/0143185 A1 | 5/2020 | Zhang et al. | |

(56) References Cited

U.S. PATENT DOCUMENTS

| | | | |
|---|---|---|---|
| 2021/0097776 A1 | 4/2021 | Faulkner et al. | |
| 2021/0104100 A1 | 4/2021 | Whitney et al. | |
| 2021/0141599 A1 | 5/2021 | Newell et al. | |
| 2023/0087244 A1 | 3/2023 | Akmal et al. | |
| 2024/0118744 A1 | 4/2024 | Vaughan et al. | |
| 2024/0248678 A1 | 7/2024 | Krivoruchko et al. | |
| 2024/0386817 A1* | 11/2024 | Sauers | G06T 19/006 |

FOREIGN PATENT DOCUMENTS

| | | |
|---|---|---|
| JP | 2019-519020 A | 7/2019 |
| JP | 2020-77136 A | 5/2020 |
| WO | 2017/200777 A1 | 11/2017 |
| WO | 2018/213401 A1 | 11/2018 |
| WO | 2021/062148 A1 | 4/2021 |
| WO | 2022/093401 A1 | 5/2022 |
| WO | 2023/239663 A1 | 12/2023 |

OTHER PUBLICATIONS

International Search Report and Written Opinion received for PCT Patent Application No. PCT/US2022/040346, mailed on Nov. 25, 2022, 14 pages.

Ashbrook Daniell., "Enabling Mobile Micro interactions", Retrieved from the Internet: URL: http://danielashbrook.com/wp-content/uploads/2012/06/2009-Ashbrook-Thesis.pdf, May 2010, 186 pages.

BBC News, "MWC 2016: Sony Xperia puts AI assistant in owner's ear", Online Available at: <http://www.bbc.com/news/technology-35627453>, Retrieved on Sep. 22, 2016, 20 pages.

Bell Jason, "Machine Learning Hands-On for Developers and Technical Professionals", Wiley, Nov. 3, 2014, 82 pages.

Bellegarda Jeromer., "Chapter 1: Spoken Language Understanding for Natural Interaction: The Siri Experience", Natural Interaction with Robots, Knowbots and Smartphones, 2014, pp. 3-14.

Coulouris et al., "Distributed Systems: Concepts and Design (Fifth Edition)", Addison-Wesley, May 7, 2011, 391 pages.

Guarese et al., "Cooking in the Dark: Exploring Spatial Audio as MR Assistive Technology for the Visually Impaired", 18th IFIP Conference on Human-Computer Interaction (Interact), Available online at: https://inria.hal.science/hal-04291191/file/520519_1_En_29_Chapter.pdf, Aug. 2021, 6 pages.

Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, online available at: https://dl.acm.org/doi/pdf/10.1145/3332165.3347873, Oct. 20-23, 2019, pp. 371-385.

Nuance Dragon Naturally Speaking, Version 13 End-User Workbook, Nuance Communications, Inc. Online Available at: https://www.nuance.com/content/dam/nuance/en_us/collateral/dragon/guide/gd-dragon-naturally-speaking-13-workbook-en-US.pdf, Sep. 2014, 125 pages.

Phoenix Solutions, Inc., "Declaration of Christopher Schmandt Regarding the MIT Galaxy System", West Interactive Corp., a Delaware Corporation, Document 40, Jul. 2, 2010, 162 pages.

Speicher et al., "What is Mixed Reality?", In Proceedings of the 2019 CHI Conference on Human Factors in Computing Systems (CHI '19). ACM, Article 537, Glasgow, Scotland, UK, online available at: https://dl.acm.org/doi/pdf/10.1145/3290605.3300767, May 4-9, 2019, 15 pages.

Villemure et al., "The Dragon Drive Innovation Showcase: Advancing the State-of-the-art in Automotive Assistants", Retrieved from the Internet: http://essv2018.de/wp-content/uploads/2018/03/41_Villemure_ESSV2018.pdf, 2018, 7 pages.

Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, Ubicomp '16, Heidelberg, Germany, online available at: https://dl.acm.org/doi/pdf/10.1145/2971648.2971730, Sep. 12-16, 2016, pp. 73-84.

Zhong et al., "JustSpeak: Enabling Universal Voice Control on Android", W4A'14, Proceedings of the 11th Web for All Conference, No. 36, Apr. 7-9, 2014, 8 pages.

Decision to Grant received for Japanese Patent Application No. 2024-510432, mailed on Jul. 28, 2025, 3 pages (1 page of English Translation and 2 pages of Official Copy).

Office Action received for Korean Patent Application No. 10-2024-7005710, mailed on Jun. 28, 2025, 14 pages (6 pages of English Translation and 8 pages of Official Copy).

Office Action received for Japanese Patent Application No. 2024-510432, mailed on Feb. 6, 2025, 6 pages (3 pages of English Translation and 3 pages of Official Copy).

Office Action received for Japanese Patent Application No. 2024-510432, mailed on May 26, 2025, 2 pages (1 page of English Translation and 1 page of Official Copy).

* cited by examiner

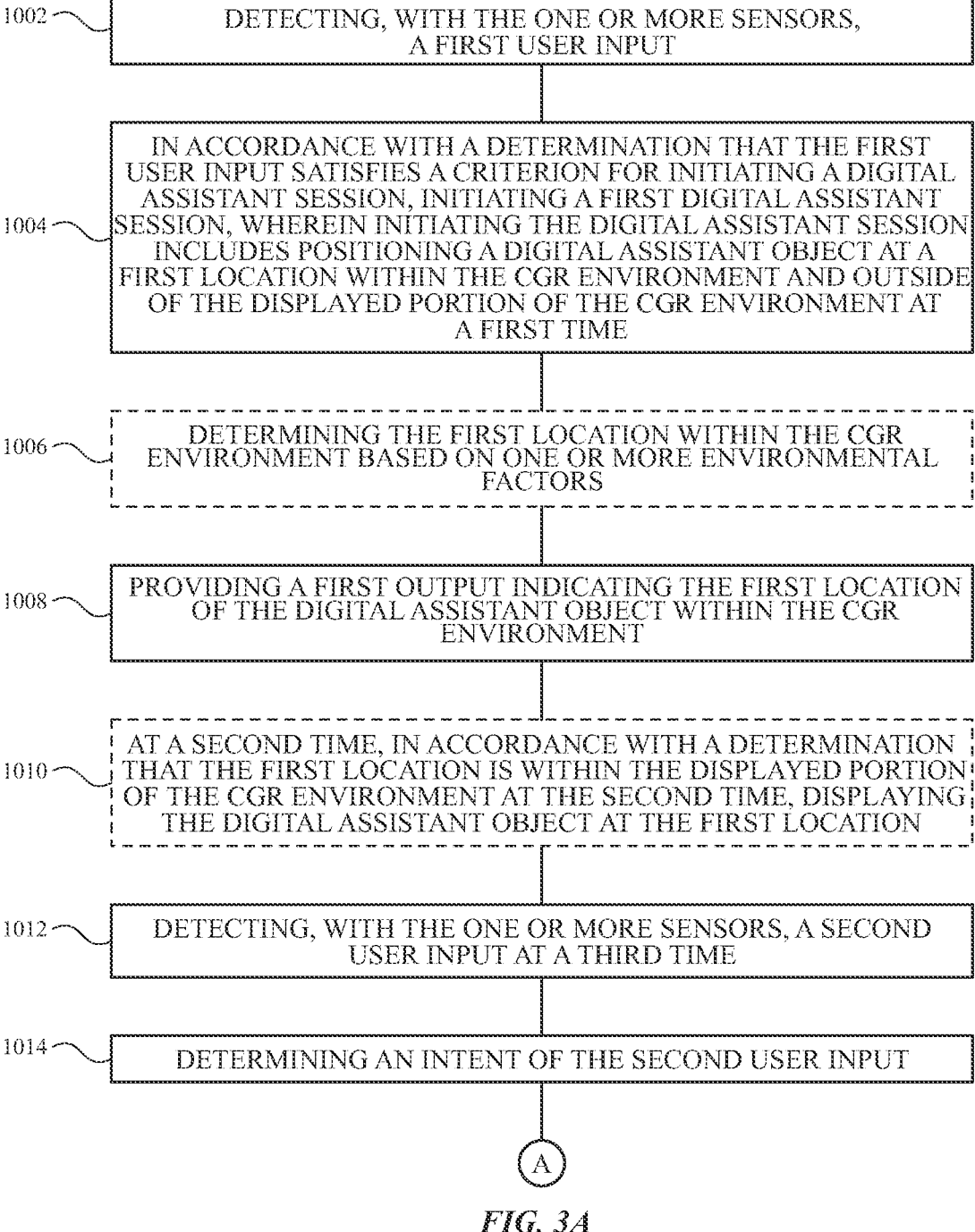

1002 — DETECTING, WITH THE ONE OR MORE SENSORS, A FIRST USER INPUT

1004 — IN ACCORDANCE WITH A DETERMINATION THAT THE FIRST USER INPUT SATISFIES A CRITERION FOR INITIATING A DIGITAL ASSISTANT SESSION, INITIATING A FIRST DIGITAL ASSISTANT SESSION, WHEREIN INITIATING THE DIGITAL ASSISTANT SESSION INCLUDES POSITIONING A DIGITAL ASSISTANT OBJECT AT A FIRST LOCATION WITHIN THE CGR ENVIRONMENT AND OUTSIDE OF THE DISPLAYED PORTION OF THE CGR ENVIRONMENT AT A FIRST TIME

1006 — DETERMINING THE FIRST LOCATION WITHIN THE CGR ENVIRONMENT BASED ON ONE OR MORE ENVIRONMENTAL FACTORS

1008 — PROVIDING A FIRST OUTPUT INDICATING THE FIRST LOCATION OF THE DIGITAL ASSISTANT OBJECT WITHIN THE CGR ENVIRONMENT

1010 — AT A SECOND TIME, IN ACCORDANCE WITH A DETERMINATION THAT THE FIRST LOCATION IS WITHIN THE DISPLAYED PORTION OF THE CGR ENVIRONMENT AT THE SECOND TIME, DISPLAYING THE DIGITAL ASSISTANT OBJECT AT THE FIRST LOCATION

1012 — DETECTING, WITH THE ONE OR MORE SENSORS, A SECOND USER INPUT AT A THIRD TIME

1014 — DETERMINING AN INTENT OF THE SECOND USER INPUT

1016 — PROVIDING A SECOND OUTPUT BASED ON THE DETERMINED INTENT

1018 — PROVIDING, BASED ON ONE OR MORE CHARACTERISTICS OF THE SECOND OUTPUT, A THIRD OUTPUT

1020 — PROVIDING A FIFTH OUTPUT SELECTED FROM TWO OR MORE DIFFERENT OUTPUTS INDICATING A STATE SELECTED FROM TWO OR MORE DIFFERENT STATES OF THE FIRST DIGITAL ASSISTANT SESSION

1022 — DISMISSING THE DIGITAL ASSISTANT OBJECT

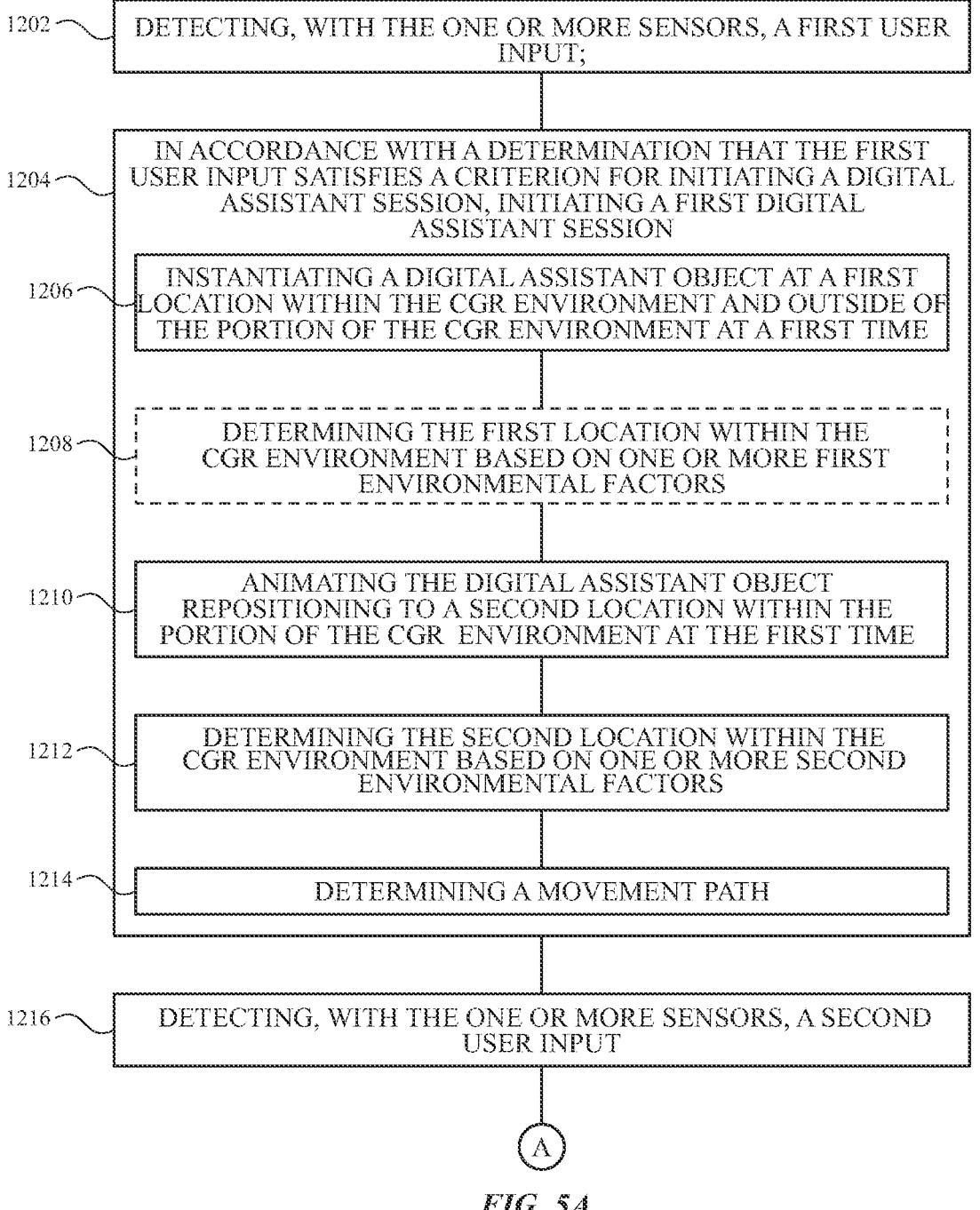

1202 — DETECTING, WITH THE ONE OR MORE SENSORS, A FIRST USER INPUT;

1204 — IN ACCORDANCE WITH A DETERMINATION THAT THE FIRST USER INPUT SATISFIES A CRITERION FOR INITIATING A DIGITAL ASSISTANT SESSION, INITIATING A FIRST DIGITAL ASSISTANT SESSION

1206 — INSTANTIATING A DIGITAL ASSISTANT OBJECT AT A FIRST LOCATION WITHIN THE CGR ENVIRONMENT AND OUTSIDE OF THE PORTION OF THE CGR ENVIRONMENT AT A FIRST TIME

1208 — DETERMINING THE FIRST LOCATION WITHIN THE CGR ENVIRONMENT BASED ON ONE OR MORE FIRST ENVIRONMENTAL FACTORS

1210 — ANIMATING THE DIGITAL ASSISTANT OBJECT REPOSITIONING TO A SECOND LOCATION WITHIN THE PORTION OF THE CGR ENVIRONMENT AT THE FIRST TIME

1212 — DETERMINING THE SECOND LOCATION WITHIN THE CGR ENVIRONMENT BASED ON ONE OR MORE SECOND ENVIRONMENTAL FACTORS

1214 — DETERMINING A MOVEMENT PATH

1216 — DETECTING, WITH THE ONE OR MORE SENSORS, A SECOND USER INPUT (A)

FIG. 5A

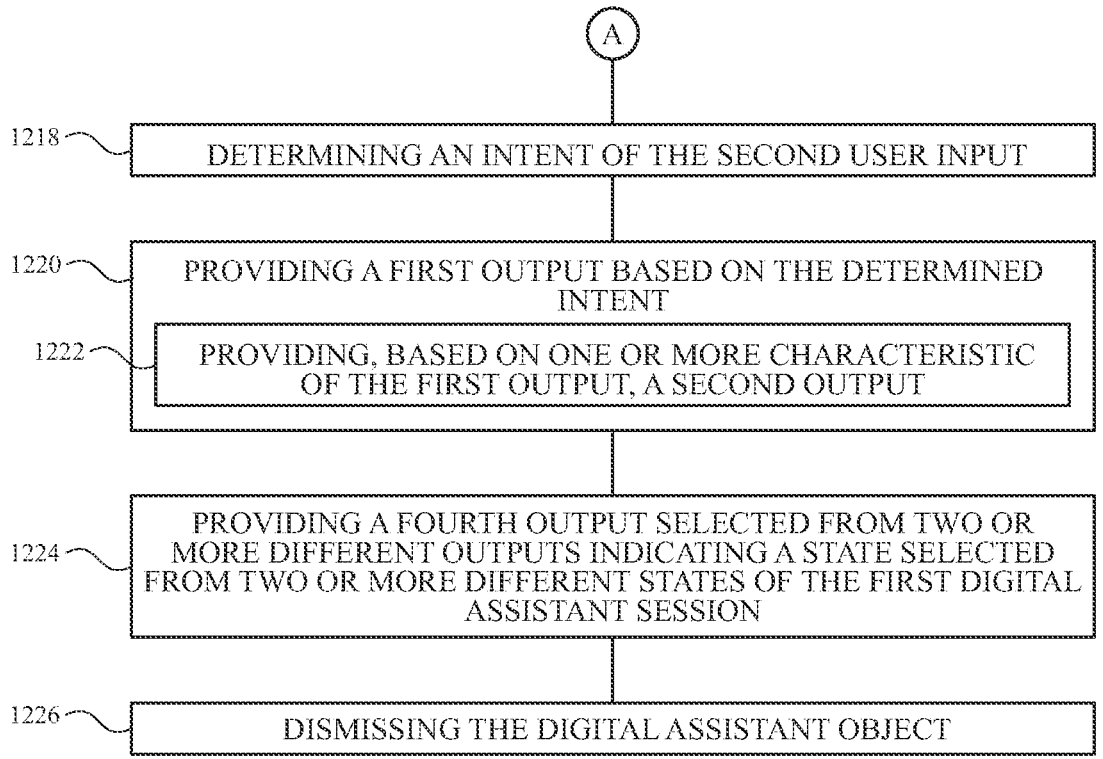

1218 — DETERMINING AN INTENT OF THE SECOND USER INPUT

1220 — PROVIDING A FIRST OUTPUT BASED ON THE DETERMINED INTENT

1222 — PROVIDING, BASED ON ONE OR MORE CHARACTERISTIC OF THE FIRST OUTPUT, A SECOND OUTPUT

1224 — PROVIDING A FOURTH OUTPUT SELECTED FROM TWO OR MORE DIFFERENT OUTPUTS INDICATING A STATE SELECTED FROM TWO OR MORE DIFFERENT STATES OF THE FIRST DIGITAL ASSISTANT SESSION

1226 — DISMISSING THE DIGITAL ASSISTANT OBJECT

*FIG. 5B*

DIGITAL ASSISTANT OBJECT PLACEMENT

CROSS-REFERENCE TO RELATED APPLICATIONS

This application is a continuation of PCT Patent Application Serial No. PCT/US2022/040346, entitled "DIGITAL ASSISTANT OBJECT PLACEMENT," filed on Aug. 15, 2022, which claims priority to U.S. Patent Application Ser. No. 63/247,557, entitled "DIGITAL ASSISTANT OBJECT PLACEMENT," filed on Sep. 23, 2021; and claims priority to U.S. Patent Application Ser. No. 63/235,424, entitled "DIGITAL ASSISTANT OBJECT PLACEMENT," filed on Aug. 20, 2021. The contents of each of these applications are incorporated herein by reference in their entirety.

FIELD

This relates generally to digital assistants and, more specifically, to placing an object representing a digital assistant in a computer-generated reality (CGR) environment.

BACKGROUND

Digital assistants can act as a beneficial interface between human users and their electronic devices, for instance, using spoken or typed natural language, gestures, or other convenient or intuitive input modes. For example, a user can utter a natural-language request to a digital assistant of an electronic device. The digital assistant can interpret the user's intent from the speech input and operationalize the user's intent into tasks. The tasks can then be performed by executing one or more services of the electronic device, and a relevant output responsive to the user request can be returned to the user.

Unlike the physical world, which a person can interact with and perceive without the use of an electronic device, an electronic device is used to interact with and/or perceive computer-generated reality (CGR) environment that is wholly or partially simulated. The CGR environment can include mixed reality (MR) content, augmented reality (AR) content, virtual reality (VR) content, and/or the like. One way to interact with a CGR system is by tracking some of a person's physical motions and, in response, adjusting characteristics of elements simulated in the CGR environment in a manner that seems to comply with at least one law of physics. For example, as a user moves the device presenting the CGR environment and/or the user's head, the CGR system can detect the movement and adjust the graphical content according to the user's point of view and the auditory content to create the effect of spatial sound. In some situations, the CGR system can adjust characteristics of the CGR content in response to user inputs, such as button inputs or vocal commands.

Many different electronic devices and/or systems can be used to interact with and/or perceive the CGR environment, such as heads-up displays (HUDs), head mountable systems, projection-based systems, headphones/earphones, speaker arrays, smartphones, tablets, and desktop/laptop computers. For example, a head mountable system may include one or more speakers (e.g., a speaker array); an integrated or external opaque, translucent, or transparent display; image sensors to capture video of the physical environment; and/or microphones to capture audio of the physical environment. The display may be implemented using a variety of display technologies, including uLEDs, OLEDs, LEDs, liquid crystal on silicon, laser scanning light source, digital light projection, and so forth, and may implement an optical waveguide, optical reflector, hologram medium, optical combiner, combinations thereof, or similar technologies as a medium through which light is directed to a user's eyes. In implementations with transparent or translucent displays, the transparent or translucent display may also be controlled to become opaque. The display may implement a projection-based system to that projects images onto users' retinas and/or project virtual CGR elements into the physical environment (e.g., as a hologram, or projection mapped onto a physical surface or object).

An electronic device may be used to implement the use of a digital assistant in a CGR environment. Implementing a digital assistant in a CGR environment may help a user of the electronic device to interact with the CGR environment, and may allow the user to access digital assistant functionality without needing to cease interaction with the CGR environment. However, as the interface of a CGR environment may be large and complex (e.g., a CGR environment may fill and extend beyond a user's field of view), invoking and interacting with a digital assistant within the CGR environment can be difficult, confusing, or distracting from the immersion of the CGR environment.

SUMMARY

Example methods are disclosed herein. An example method includes, at an electronic device having one or more processors, memory, a display, and one or more sensors: while displaying a portion of a computer-generated reality (CGR) environment representing a current field of view of a user of the electronic device: detecting, with the one or more sensors, a first user input; in accordance with a determination that the first user input satisfies at least one criterion for initiating a digital assistant session, initiating a first digital assistant session, wherein initiating the first digital assistant session includes positioning a digital assistant object at a first location within the CGR environment and outside of the displayed portion of the CGR environment at a first time; and providing a first output indicating the first location of the digital assistant within the CGR environment.

Example non-transitory computer-readable media are disclosed herein. An example non-transitory computer-readable storage medium stores one or more programs. The one or more programs comprise instructions, which when executed by one or more processors of an electronic device, cause the electronic device to detect, with the one or more sensors, a first user input; in accordance with a determination that the first user input satisfies at least one criterion for initiating a digital assistant session, initiate a first digital assistant session, wherein initiating the first digital assistant session includes positioning a digital assistant object at a first location within the CGR environment and outside of the displayed portion of the CGR environment at a first time; and provide a first output indicating the first location of the digital assistant within the CGR environment.

Example electronic devices are disclosed herein. An example electronic device comprises one or more processors; a memory; and one or more programs, where the one or more programs are stored in the memory and configured to be executed by the one or more processors, the one or more programs including instructions for detecting, with the one or more sensors, a first user input; in accordance with a determination that the first user input satisfies at least one criterion for initiating a digital assistant session, initiating a first digital assistant session, wherein initiating the first digital assistant session includes positioning a digital assistant object at a first location within the CGR environment and outside of the displayed portion of the CGR environment at a first time; and providing a first output indicating the first location of the digital assistant within the CGR environment.

An example electronic device comprises means for detecting, with one or more sensors, a first user input; in accordance with a determination that the first user input satisfies at least one criterion for initiating a digital assistant session, initiating a first digital assistant session, wherein initiating the first digital assistant session includes positioning a digital assistant object at a first location within the CGR environment and outside of the displayed portion of the CGR environment at a first time; and providing a first output indicating the first location of the digital assistant within the CGR environment.

Example methods are disclosed herein. An example method includes, at an electronic device having one or more processors, memory, a display, and one or more sensors: detecting, with the one or more sensors, a user input; and in accordance with a determination that the first user input satisfies a criterion for initiating a digital assistant session, initiating a first digital assistant session, wherein initiating the first digital assistant session includes: while displaying, on the display, a first portion of a computer-generated reality (CGR) environment, positioning a digital assistant object at a first location within the CGR environment and outside of the first portion of the CGR environment; and providing a first output indicating the first location of the digital assistant object within the CGR environment.

Example non-transitory computer-readable media are disclosed herein. An example non-transitory computer-readable storage medium stores one or more programs. The one or more programs comprise instructions, which when executed by one or more processors of an electronic device, cause the electronic device to detect, with the one or more sensors, a user input; and in accordance with a determination that the first user input satisfies a criterion for initiating a digital assistant session, initiate a first digital assistant session, wherein initiating the first digital assistant session includes: while displaying, on the display, a first portion of a computer-generated reality (CGR) environment, positioning a digital assistant object at a first location within the CGR environment and outside of the first portion of the CGR environment; and providing a first output indicating the first location of the digital assistant object within the CGR environment.

Example electronic devices are disclosed herein. An example electronic device comprises one or more processors; a memory; and one or more programs, where the one or more programs are stored in the memory and configured to be executed by the one or more processors, the one or more programs including instructions for detecting, with the one or more sensors, a user input; and in accordance with a determination that the first user input satisfies a criterion for initiating a digital assistant session, initiating a first digital assistant session, wherein initiating the first digital assistant session includes: while displaying, on the display, a first portion of a computer-generated reality (CGR) environment, positioning a digital assistant object at a first location within the CGR environment and outside of the first portion of the CGR environment; and providing a first output indicating the first location of the digital assistant object within the CGR environment.

An example electronic device comprises means for detecting, with one or more sensors, a user input; and in accordance with a determination that the first user input satisfies a criterion for initiating a digital assistant session, initiating a first digital assistant session, wherein initiating the first digital assistant session includes: while displaying, on the display, a first portion of a computer-generated reality (CGR) environment, positioning a digital assistant object at a first location within the CGR environment and outside of the first portion of the CGR environment; and providing a first output indicating the first location of the digital assistant object within the CGR environment.

Example methods are disclosed herein. An example method includes, at an electronic device having one or more processors, memory, a display, and one or more sensors: while displaying, on the display, a portion of a computer-generated reality (CGR) environment: detecting, with the one or more sensors, a first user input; and in accordance with a determination that the first user input satisfies a criterion for initiating a digital assistant session, initiating a first digital assistant session, wherein initiating the first digital assistant session includes: initiating a digital assistant object at a first location within the CGR environment and outside of the portion of the CGR environment at a first time; and animating the digital assistant object repositioning to a second location within the portion of the CGR environment at a first time.

Example non-transitory computer-readable media are disclosed herein. An example non-transitory computer-readable storage medium stores one or more programs. The one or more programs comprise instructions, which when executed by one or more processors of an electronic device, cause the electronic device to: while displaying, on the display, a portion of a computer-generated reality (CGR) environment: detect, with the one or more sensors, a first user input; and in accordance with a determination that the first user input satisfies a criterion for initiating a digital assistant session, initiate a first digital assistant session, wherein initiating the first digital assistant session includes: initiating a digital assistant object at a first location within the CGR environment and outside of the portion of the CGR environment at a first time; and animating the digital assistant object repositioning to a second location within the portion of the CGR environment at a first time.

Example electronic devices are disclosed herein. An example electronic device comprises one or more processors; a memory; and one or more programs, where the one or more programs are stored in the memory and configured to be executed by the one or more processors, the one or more programs including instructions for: while displaying, on the display, a portion of a computer-generated reality (CGR) environment: detecting, with the one or more sensors, a first user input; and in accordance with a determination that the first user input satisfies a criterion for initiating a digital assistant session, initiating a first digital assistant session, wherein initiating the first digital assistant session includes: initiating a digital assistant object at a first location within the CGR environment and outside of the portion of the CGR environment at a first time; and animating the digital assistant object repositioning to a second location within the portion of the CGR environment at a first time.

An example electronic device comprises means for: while displaying, on the display, a portion of a computer-generated reality (CGR) environment: detecting, with the one or more sensors, a first user input; and in accordance with a determination that the first user input satisfies a criterion for initiating a digital assistant session, initiating a first digital assistant session, wherein initiating the first digital assistant session includes: initiating a digital assistant object at a first location within the CGR environment and outside of the portion of the CGR environment at a first time; and animating the digital assistant object repositioning to a second location within the portion of the CGR environment at a first time.

Positioning a representation of a digital assistant within a computer-generated reality (CGR) environment, as described herein, provides an intuitive and efficient user interface for interacting with the digital assistant in the CGR environment. For example, initially positioning a digital assistant object outside a user's field of view and providing an indication of the digital assistant object's location efficiently draws the user's attention to the digital assistant, reducing the time and user inputs needed for the user to access desired functionality, and thus reducing the power usage and improving the battery life of the device. As another example, initializing a digital assistant object outside a user's field of view and animating the digital assistant moving into the user's field of view also efficiently draws the user's attention to the digital assistant, reducing the time and user inputs needed for the user to access desired functionality, and thus reducing the power usage and improving the battery life of the device.

BRIEF DESCRIPTION OF THE DRAWINGS

FIGS. 3A-3B illustrate a flow diagram of a method for positioning a representation of a digital assistant within a CGR environment, according to various examples.

FIGS. 5A-5B illustrate a flow diagram of a method for positioning a representation of a digital assistant within a CGR environment, according to various examples.

DETAILED DESCRIPTION

Figure 1A:
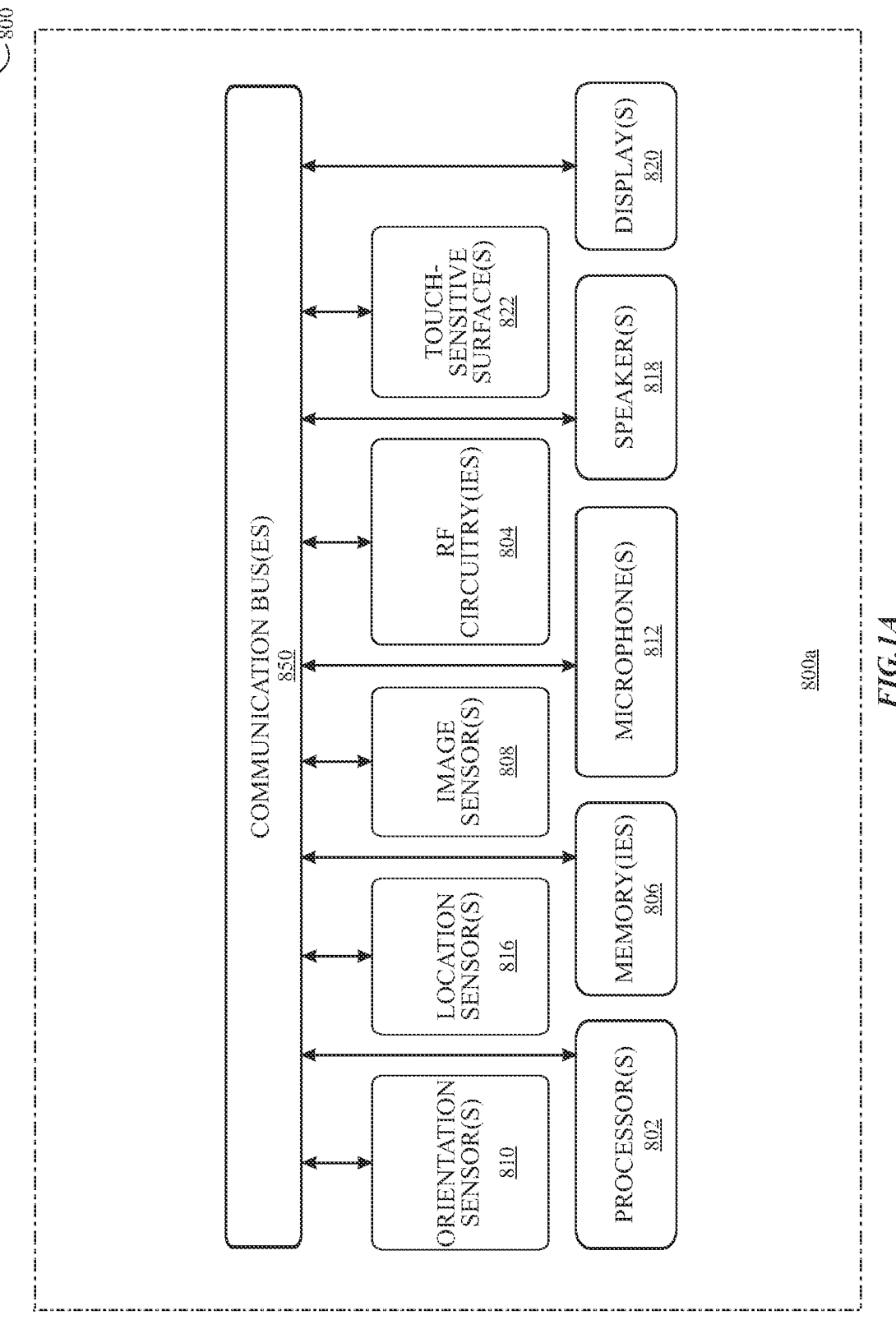
FIGS. 1A-1B depict an exemplary system for use in various extended reality technologies, according to various examples.

In the following description of examples, reference is made to the accompanying drawings in which are shown by way of illustration specific examples that can be practiced. It is to be understood that other examples can be used and structural changes can be made without departing from the scope of the various examples.

A digital assistant may be used within a CGR environment. In some embodiments, upon invocation, a digital assistant object representing the digital assistant may be positioned at a first location within the CGR environment but outside of a current field of view of a user, and an indication of the digital assistant object's location may be provided. In some embodiments, upon invocation, a digital assistant object may be positioned at a first location within the CGR environment but outside of a current field of view of a user and then animated moving from the first location to a second, visible location.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/of" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. Process for Positioning a Representation of a Digital Assistant within a CGR Environment FIG. 1A and FIG. 1B depict exemplary system 800 for use in various computer-generated reality technologies.

In some examples, as illustrated in FIG. 1A, system 800 includes device 800a. Device 800a includes various components, such as processor(s) 802, RF circuitry(ies) 804, memory(ies) 806, image sensor(s) 808, orientation sensor(s) 810, microphone(s) 812, location sensor(s) 816, speaker(s) 818, display(s) 820, and touch-sensitive surface(s) 822. These components optionally communicate over communication bus(es) 850 of device 800a.

In some examples, elements of system 800 are implemented in a base station device (e.g., a computing device, such as a remote server, mobile device, or laptop) and other elements of system 800 are implemented in a head-mounted display (HMD) device designed to be worn by the user, where the HMD device is in communication with the base station device. In some examples, device 800a is implemented in a base station device or HMD device.

Figure 1B:
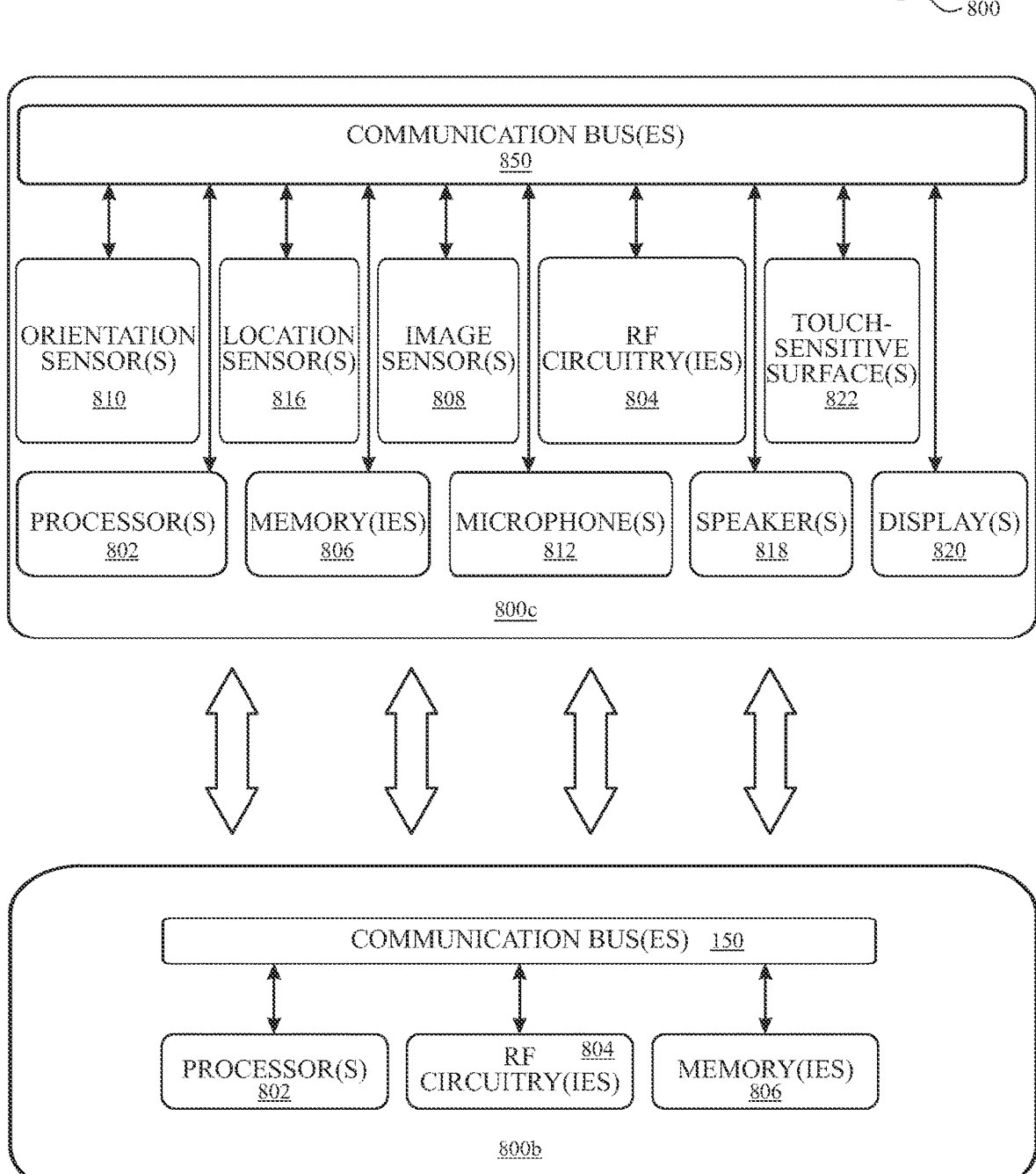

As illustrated in FIG. 1B, in some examples, system 800 includes two (or more) devices in communication, such as through a wired connection or a wireless connection. First device 800b (e.g., a base station device) includes processor(s) 802, RF circuitry(ies) 804, and memory(ies) 806. These components optionally communicate over communication bus(es) 850 of device 800b. Second device 800c (e.g., a head-mounted device) includes various components, such as processor(s) 802, RF circuitry(ies) 804, memory(ies) 806, image sensor(s) 808, orientation sensor(s) 810, microphone(s) 812, location sensor(s) 816, speaker(s) 818, display(s) 820, and touch-sensitive surface(s) 822. These components optionally communicate over communication bus(es) 850 of device 800c.

System 800 includes processor(s) 802 and memory(ies) 806. Processor(s) 802 include one or more general processors, one or more graphics processors, and/or one or more digital signal processors. In some examples, memory(ies) 806 are one or more non-transitory computer-readable storage mediums (e.g., flash memory, random access memory) that store computer-readable instructions configured to be executed by processor(s) 802 to perform the techniques described below.

System 800 includes RF circuitry(ies) 804. RF circuitry(ies) 804 optionally include circuitry for communicating with electronic devices, networks, such as the Internet, intranets, and/or a wireless network, such as cellular networks and wireless local area networks (LANs). RF circuitry(ies) 804 optionally includes circuitry for communicating using near-field communication and/or short-range communication, such as Bluetooth®.

System 800 includes display(s) 820. In some examples, display(s) 820 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 820 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 800 includes touch-sensitive surface(s) 822 for receiving user inputs, such as tap inputs and swipe inputs. In some examples, display(s) 820 and touch-sensitive surface(s) 822 form touch-sensitive display(s).

System 800 includes image sensor(s) 808. Image sensors(s) 808 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 808 also optionally include one or more event camera(s) configured to capture movement of physical objects in the real environment. Image sensor(s) 808 also optionally include one or more depth sensor(s) configured to detect the distance of physical objects from system 800. In some examples, system 800 uses CCD sensors, event cameras, and depth sensors in combination to detect the physical environment around system 800. In some examples, image sensor(s) 808 include a first image sensor and a second image sensor. The first image sensor and the second image sensor are optionally configured to capture images of physical objects in the real environment from two distinct perspectives. In some examples, system 800 uses image sensor(s) 808 to receive user inputs, such as hand gestures. In some examples, system 800 uses image sensor(s) 808 to detect the position and orientation of system 800 and/or display(s) 820 in the real environment. For example, system 800 uses image sensor(s) 808 to track the position and orientation of display(s) 820 relative to one or more fixed objects in the real environment.

In some examples, system 800 includes microphones(s) 812. System 800 uses microphone(s) 812 to detect sound from the user and/or the physical setting of the user. In some examples, microphone(s) 812 includes an array of microphones (including a plurality of microphones) that optionally operate in tandem, such as to identify ambient noise or to locate the source of sound in space of the real environment.

System 800 includes orientation sensor(s) 810 for detecting orientation and/or movement of system 800 and/or display(s) 820. For example, system 800 uses orientation sensor(s) 810 to track changes in the position and/or orientation of system 800 and/or display(s) 820, such as with respect to physical objects in the real environment. Orientation sensor(s) 810 optionally include one or more gyroscopes and/or one or more accelerometers.

FIGS. 2A-2E illustrate a process (e.g., method 1000) for positioning a representation of a digital assistant within a CGR environment, according to various embodiments. The process is performed, for example, using one or more electronic devices implementing a digital assistant. In some examples, the process is performed using a client-server system, and the steps of the process are divided up in any manner between the server and a client device. In other examples, the steps of the process are divided up between the server and multiple client devices (e.g., a head mountable system (e.g., headset) and a smart watch). Thus, while portions of the process are described herein as being performed by particular devices of a client-server system, it will be appreciated that the process is not so limited. In other examples, the process is performed using only a client device (e.g., device 906) or only multiple client devices. In the process, some steps are, optionally, combined, the order of some steps is, optionally, changed, and some steps are, optionally, omitted. In some examples, additional steps may be performed in combination with the illustrated process.

In some embodiments, device 906 is implemented as shown in FIGS. 1A-1B, e.g., device 800*a* or 800*c*. In some embodiments, device 906 is in communication (e.g., using 5G, WiFi, wired connections, or the like), directly or indirectly (e.g., via a hub device, server, or the like), with one or more other electronic devices, such as computers, mobile devices, smart home devices, or the like. For example, as depicted in FIGS. 2A-2E, device 906 may be connected, directly or indirectly, to smart watch device 910, smart speaker device 912, television 914, and/or stereo system 916. In some embodiments, as described with respect to FIGS. 1A-1B, device 906 has (and/or is in direct or indirect communication with other devices possessing) one or more sensors, such as image sensors (e.g., for capturing visual content of the physical environment, gaze detection, or the like), orientation sensors, microphones, location sensors, touch-sensitive surfaces, accelerometers, or the like.

With reference to FIGS. 2A-2E, user 902 is shown immersed in computer-generated reality (CGR) environment 904 using device 906 at various steps of process 900. The right panels of FIG. 2A-2E each depict a corresponding currently-displayed portion 908 of CGR environment 904 (e.g., the current field-of-view of user 902) at the respective steps of process 900, as displayed on one or more displays of device 906.

In some embodiments, CGR environment 904 may contain mixed reality (MR) content, augmented reality (AR) content, virtual reality (VR) content, and/or the like. For example, as depicted in FIGS. 2A-2E, CGR environment contains MR content, allowing the user to view both physical objects and environments (e.g., physical devices 910, 912, 914, or 916; the furniture or walls in the room where user 902 is located; or the like) and virtual objects 918A-C (e.g., virtual furniture items including a chair, a picture frame, and a vase).

Figure 2A:
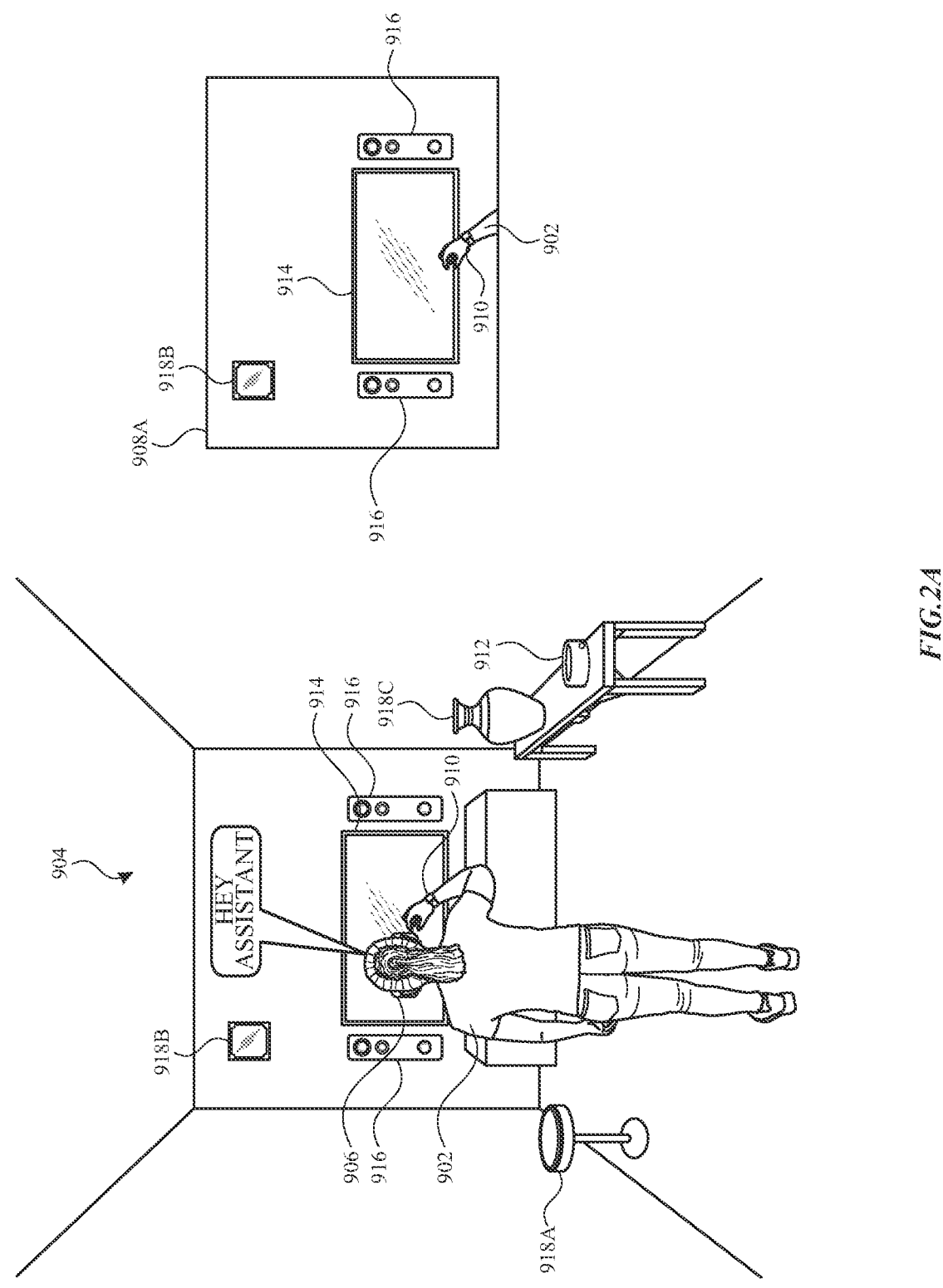
FIGS. 2A-2E illustrate a process for positioning a representation of a digital assistant within a CGR environment, according to various examples.

Referring now to FIG. 2A, device 906 detects (e.g., using the one or more sensors), a user input. In currently-displayed portion 908A (e.g., user 902's current field-of-view while providing the user input), the physical devices television 914 and stereo system 916 are visible, along with virtual object 918B.

In some embodiments, the user input may include an audio input, such as a voice input including a trigger phrase; a gaze input, such as a user directing their gaze at a particular location for at least a threshold period of time; a gesture input; a button press, tap, controller, touchscreen, or device input; and/or the like. For example, as shown in FIG. 2A, device 906 detects user 902 uttering "Hey Assistant" and/or user 902 raising her wrist in a "raise-to-speak" gesture. Although both the spoken input "Hey Assistant" and the "raise-to-speak" gesture are provided, one of those inputs alone may be sufficient to trigger a digital assistant session (e.g., as described with respect to FIG. 2B).

Figure 2B:
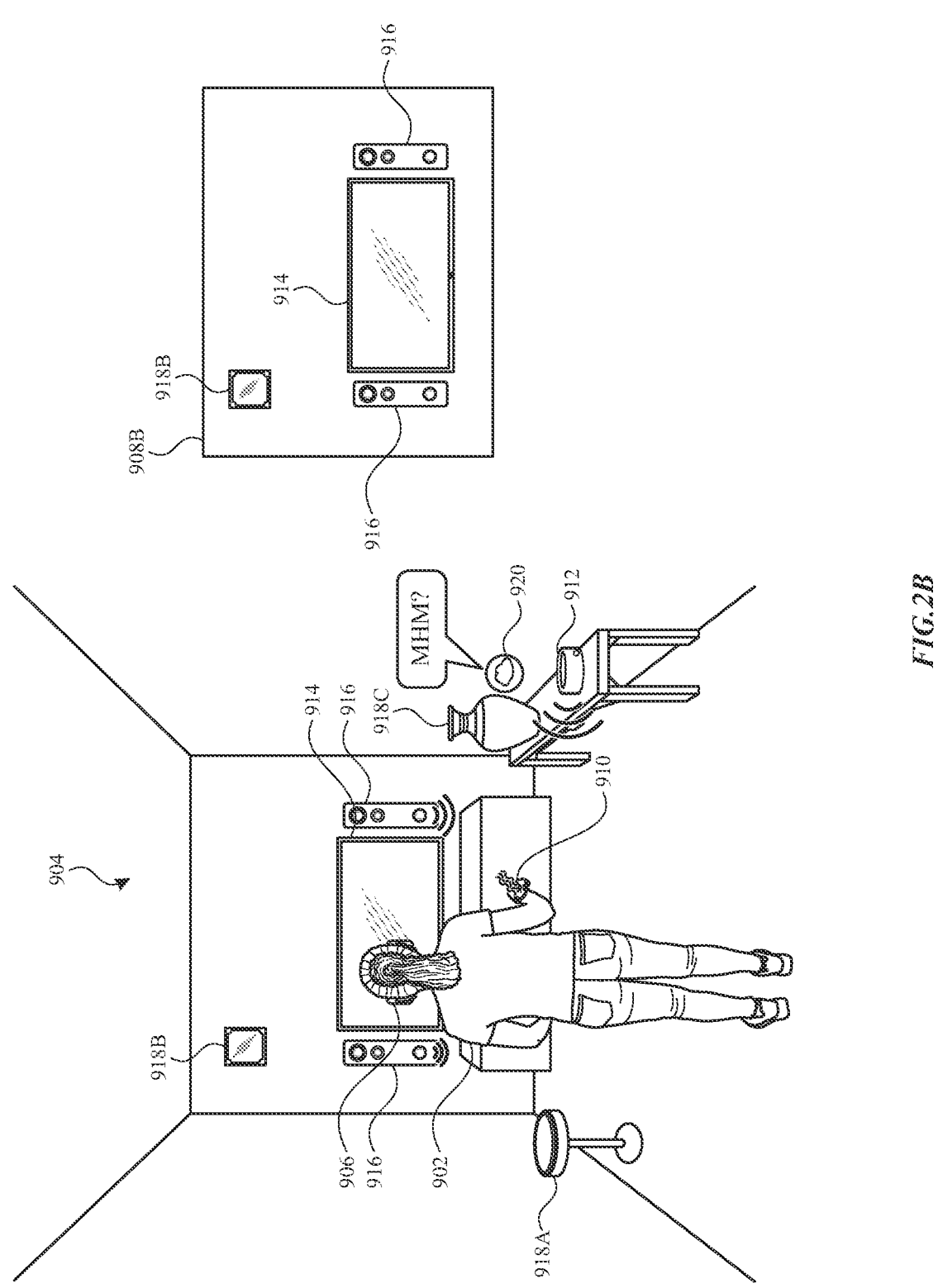

Referring now to FIG. 2B, in accordance with a determination that the user input satisfies one or more criteria for initiating a digital assistant session, a digital assistant session is initiated. For example, as shown in FIG. 2B, the criteria for initiating a digital assistant session may include a criterion for matching a predefined audio trigger (e.g., "Hey Assistant") and/or matching a predefined gesture trigger (e.g., a "raise-to-speak" gesture). Thus, when user 902 raises her wrist in the "raise-to-speak" gesture and utters the trigger phrase "Hey Assistant" as illustrated (as in FIG. 2A), the digital assistant session is initiated.

Initiating the digital assistant session includes positioning a digital assistant object 920 at a first location (e.g., first position) within CGR environment 904. As shown in FIG. 2B, digital assistant object 920 is a virtual (e.g., VR) orb located at a first location near physical smart speaker device 912. However, as the first location of digital assistant object 920 is to the right of user 902, and user 902 is gazing forward, the first position of digital assistant object 920 is outside of (e.g., not visible within) currently-displayed portion 908B at the time the digital assistant session is initiated.

In some embodiments, the first location of digital assistant object 920 may be determined based on one or more environmental factors, such as features of the physical environment; features of CGR environment 904; the location, position, or pose of user 902; the location, position, or pose of other possible users; and so forth.

For example, the first location of digital assistant object 920 may be chosen to be close to the location of physical smart speaker device 912 and to avoid collision (e.g., visual intersection) with physical objects (such as the table on which physical smart speaker device 912 sits) and/or virtual objects 918A-C (such as virtual object 918C). The location of smart speaker device 912 may be determined based on a pre-identified location (e.g., a user of smart speaker device 912 manually identifying and tagging the device location), based on visual analysis of image sensor data (e.g., by analyzing image sensor data, such as data from image sensor(s) 808, to recognize smart speaker device 912), based on analysis of other sensor data (e.g., using a Bluetooth connection for the general vicinity), or the like.

In some embodiments, device 906 may provide an output indicating a state of the digital assistant session. The state output may be selected from between two or more different outputs representing a state selected from two or more different states. For example, the two or more states may include a listening state, which may be further sub-divided into active and passive listening states, a responding state, a thinking (e.g., processing) state, an attention-getting state, and so forth, which may be indicated by visual, audio, and/or haptic outputs.

For example, as shown in FIG. 2B, the appearance of digital assistant object 920 (e.g., the virtual orb) includes a cloud shape in the middle of the orb, indicating that the digital assistant object 920 is in an attention-getting state. Other state outputs may include changes to the size of digital assistant object 920, movement animations (e.g., animating digital assistant object 920 hopping, hovering, or the like), audio outputs (e.g., a directional voice output "originating" from the current location of digital assistant object 920), changes in lighting effects (e.g., changes to the lighting or glow emitted by digital assistant object 920 or changes to pixels or light sources "pinned" to the edge of the display in the direction of digital assistant object 920), haptic outputs, or the like.

Initiating the digital assistant session includes causing an output to be produced indicating the first location of digital assistant object 920 within CGR environment 904. In some embodiments, the output may include an audio output, such as an audio output using spatial sound to indicate location, a haptic output, or a visual indication. For example, as shown in FIG. 2B, the output includes a spoken audio output "Mhm?," output from smart speaker device 912 and stereo system 916. The spoken audio output "Mhm?," may be provided using spatial sound techniques, producing a component of the audio signal coming from smart speaker device 912 more loudly than components of the audio signal coming from stereo system 916, such that the output sounds as if it were coming from the first location of digital assistant object 920 (e.g., from the user's right hand side as shown in FIG. 2B).

As another example, as shown in FIG. 2B, the output further includes a skin-tap haptic output at user 902's right wrist from smart watch device 910, indicating that the first location is to the right of the user.

As a further example, the output may include a visual indication of the first location (i.e., a visual indication other than the display of the digital assistant object, which is currently out-of-view). The visual output may be provided using the display of device 906, such as a change in the lighting of the CGR environment indicating a glow emitting from the first location (e.g., rendering light and shadow in 3D space visible in currently-displayed portion 908B; "pinning" lighted pixels or light sources to the edge of currently-displayed portion 908B in the direction of the first location; and/or displaying a heads-up display or 2D lighting overlay). The visual output may also be provided using non-display hardware, such as edge lighting (e.g., LEDs or the like) illuminated in the direction of the first location. The lighting or glow may change in intensity to further draw attention to the first location.

Figure 2C:
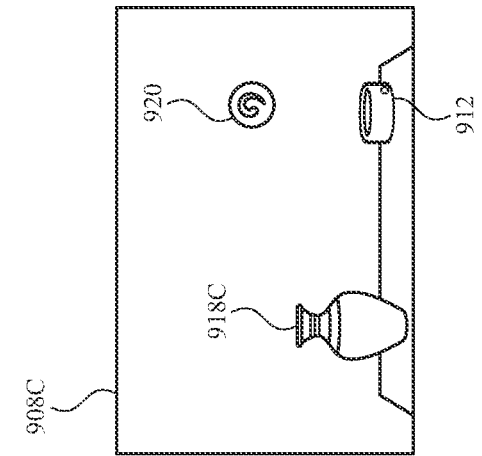
Figure 2C:
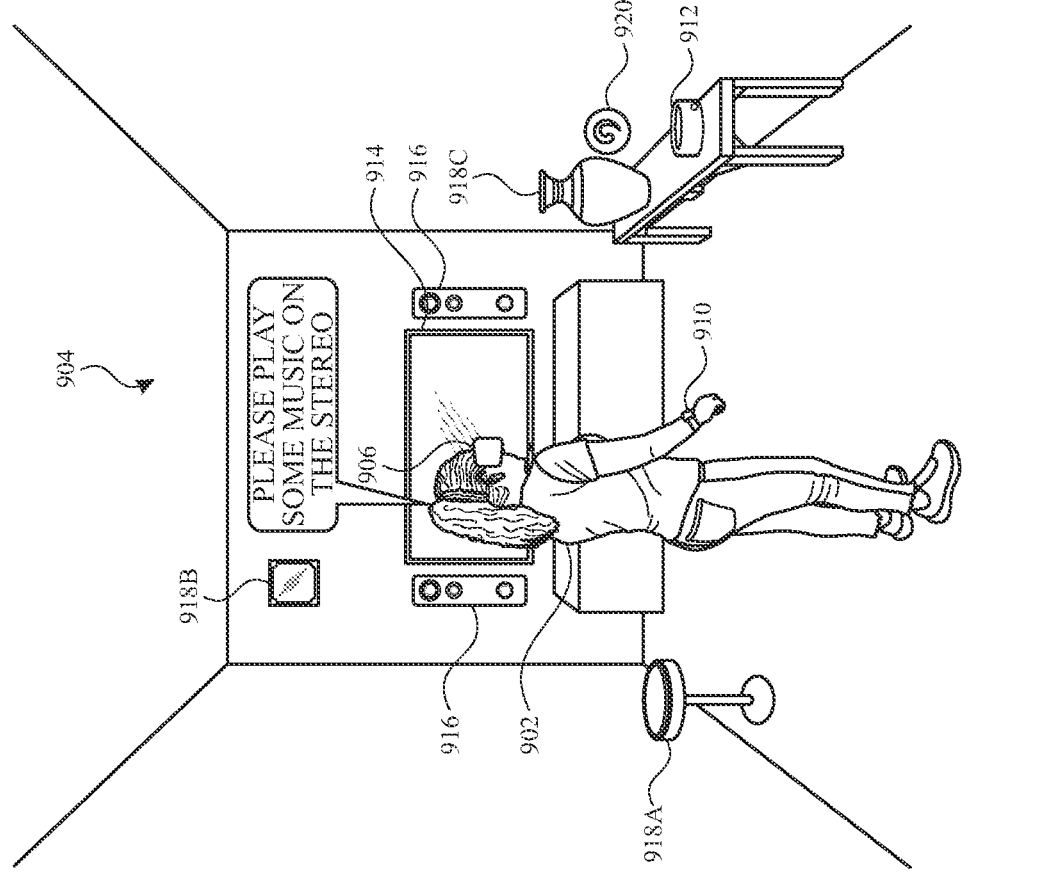

Referring now to FIG. 2C, in some embodiments, after initiating the digital assistant session, in accordance with a determination that the first location falls within currently-displayed portion 908C (e.g., once user 902 is positioned such that the first location falls within user 902's current field-of-view), digital assistant object 920 is displayed (e.g., on a display of device 906).

As the digital assistant session progresses, device 906 may provide an updated output indicating an updated state of the digital assistant session. For example, as shown in FIG. 2C, as the digital assistant session has entered an active listening state, digital assistant object 920 includes a swirl shape in the middle of the orb, indicating that the digital assistant object 920 is in an active listening state.

In some embodiments, device 906 detects (e.g., using the one or more sensors), a second user input. Device 906 then determines an intent of the second user input, for example, using natural-language processing methods. For example, as shown in FIG. 2C, device 906 detects user 902 speaking a request, "Please play some music on the stereo," corresponding to an intent to play audio.

In some embodiments, device 906 determines the intent in accordance with a determination that the first location falls within currently-displayed portion 908C (e.g., user 902's current field-of-view at the time user 902 provides the second user input). That is, in some embodiments, the digital assistant only responds in accordance with a determination that user 902 has turned her attention to (e.g., looked at) digital assistant object 920, and thus intends to address digital assistant object 920.

Figure 2D:
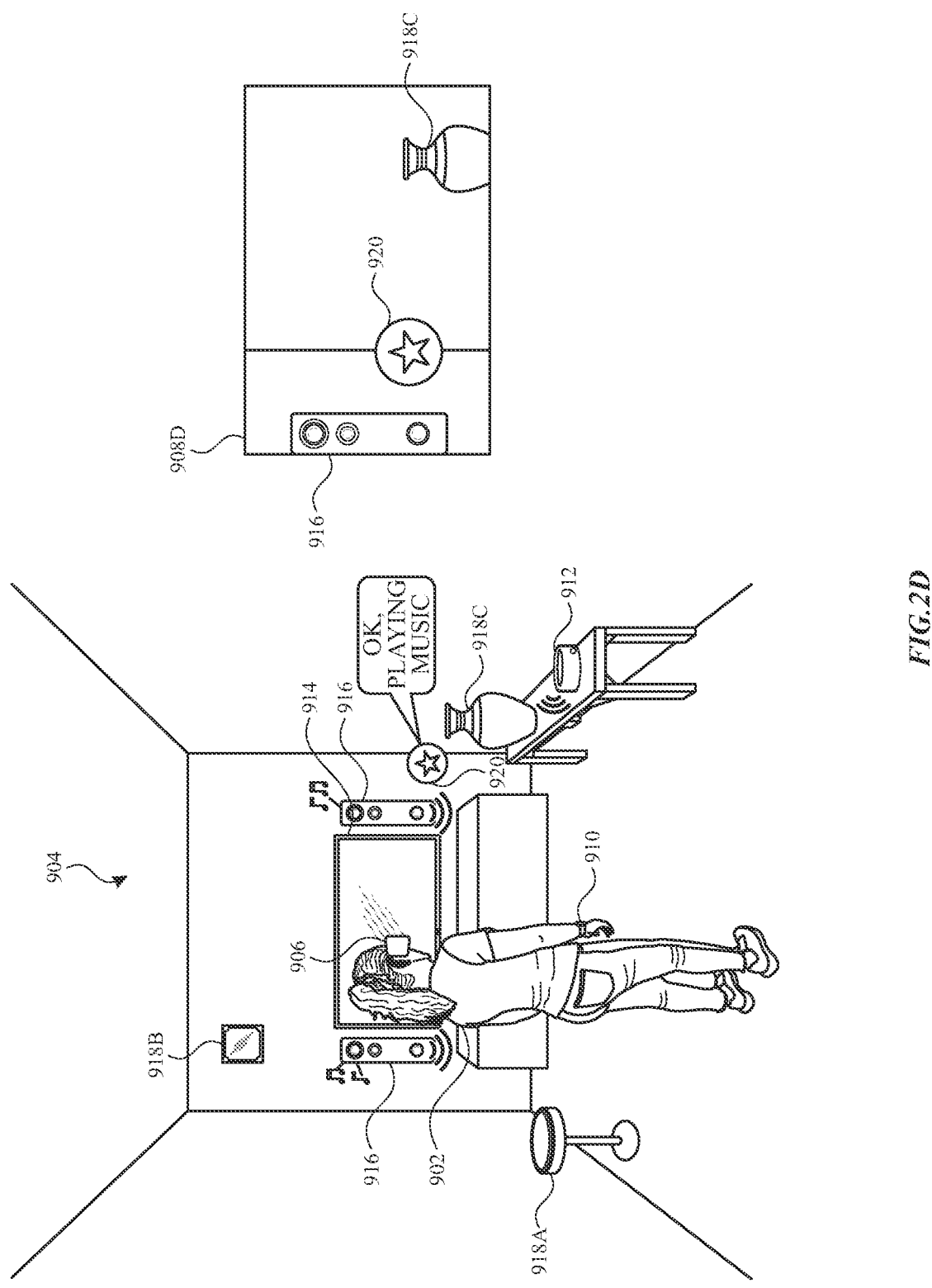

Referring now to FIG. 2D, in some embodiments, after determining the intent of the second user input, device 906 provides a response output based on the determined intent. For example, as shown in FIG. 2D, in response to the user input "Please play some music on the stereo," based on the determined intent of playing audio, device 906 causes music to be played from stereo system 916.

In some embodiments, in accordance with a determination that the determined intent relates to an object located at an object location in CGR environment 904 (e.g., either a physical or virtual object), providing the response output includes positioning digital assistant object 920 near the object location. For example, as shown in FIG. 2D, in addition to causing music to be played from stereo system 916, device 906 causes the digital assistant object 920 to relocate near the location of stereo system 906, indicating that the digital assistant is completing the task. Additionally, as shown in FIG. 2D, the appearance of digital assistant object 920 may be updated to indicate that the digital assistant object 920 is in a responding state, such as including a star shape in the middle of the orb as shown, or any other suitable state output (e.g., as described above with respect to FIG. 2B) may be provided.

Figure 2E:
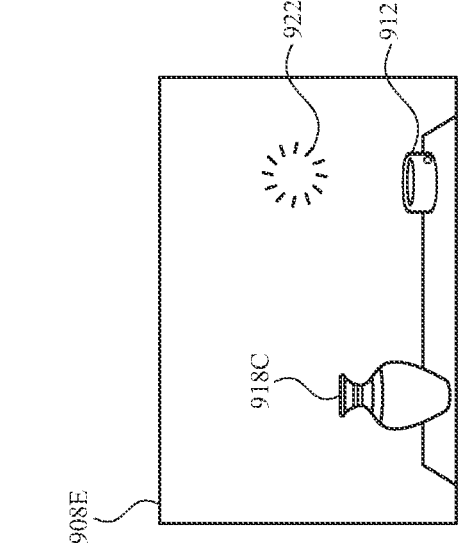
Figure 2E:
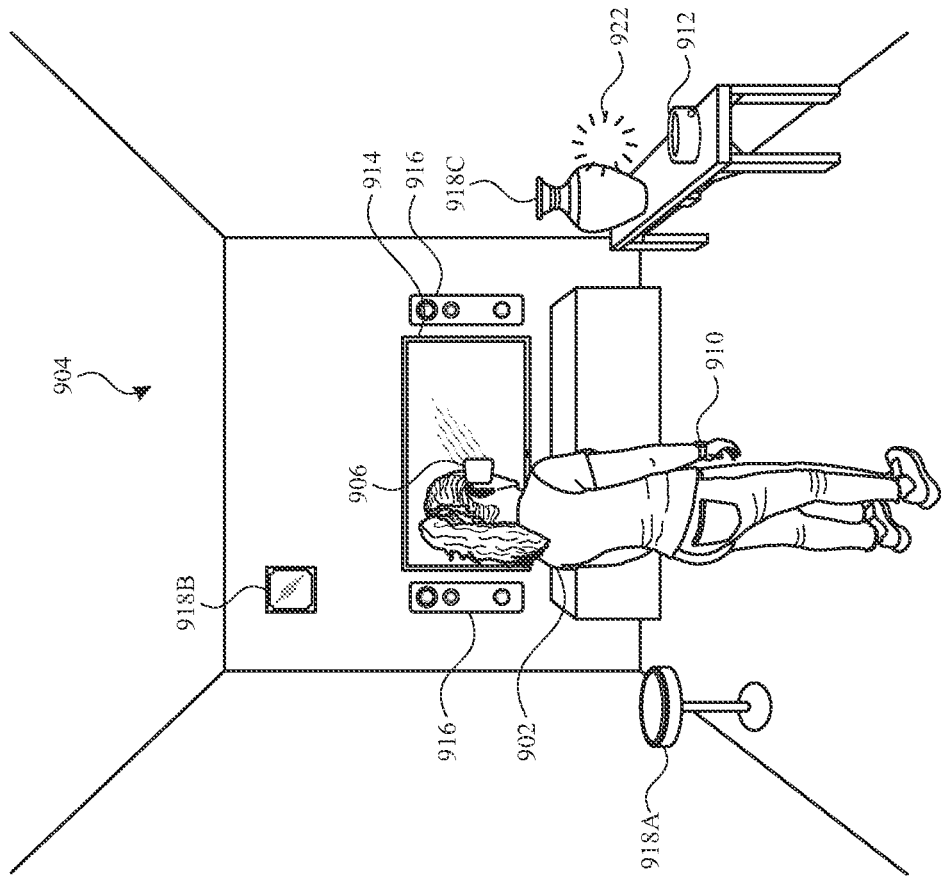

Referring now to FIG. 2E, in some embodiments, the digital assistant session may come to an end, for example, if user 902 explicitly dismisses the digital assistant (e.g., using a voice input; gaze input; gesture input; button press, tap, controller, touchscreen, or device input; or the like), or automatically (e.g., after a predetermined threshold period of time without any interaction). When the digital assistant session ends, device 906 dismisses digital assistant object 920. If, as shown in FIG. 2E, the current location of the digital assistant object 920 falls within currently-displayed portion 908E (e.g., user 902's current field-of-view at the time the digital assistant session ends), dismissing digital assistant object 920 includes ceasing to display digital assistant object 920.

In some embodiments, dismissing the digital assistant may also include providing a further output indicating the dismissal. The dismissal output may include indications such as an audio output (e.g., a chime, spoken output, or the like) or a visual output (e.g., a displayed object, changing the lighting of CGR environment 904, or the like). For example, as shown in FIG. 2E, the dismissal output includes digital assistant indicator 922, positioned at the first location (e.g., the initial location of digital assistant object 920), thus indicating where digital assistant object 920 would reappear if another digital assistant session were initiated. As the first location is within currently-displayed portion 908E (e.g., user 902's current field-of-view at the time the digital assistant session ends), device 906 displays digital assistant indicator 922.

The process described above with reference to FIGS. 2A-2E is optionally implemented by components depicted in FIGS. 1A-1B. For example, the operations of the illustrated process may be implemented by an electronic device (e.g., 800a, 800b, 800c, or 906). It would be clear to a person having ordinary skill in the art how other processes are implemented based on the components depicted in FIGS. 1A-1B.

Figure 3B:
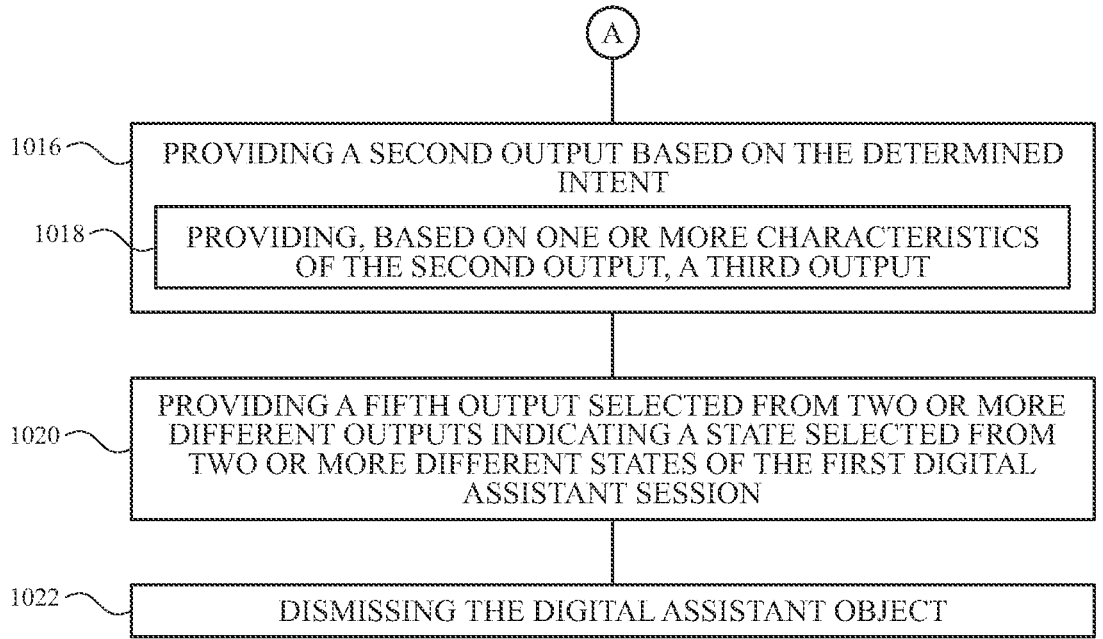

FIGS. 3A-3B illustrate a flow diagram of method 1000 for positioning a representation of a digital assistant within a computer-generated reality (CGR) environment in accordance with some embodiments. Method 1000 may be performed using one or more electronic devices (e.g., devices 800a, 80b, 800c, 906) with one or more processors and memory. In some embodiments, method 1000 is performed using a client-server system, with the operations of method 1000 divided up in any manner between the client device(s) (e.g., 800c, 906) and the server. Some operations in method 1000 are, optionally, combined, the orders of some operations are, optionally, changed, and some operations are, optionally, omitted.

Method 1000 is performed while displaying at least a portion of the CGR environment. That is, at a particular time, the particular portion of the CGR environment being displayed represents a current field-of-view of a user (e.g., the user of the client device(s)), while other portions of the CGR environment (e.g., behind the user or outside of the user's peripheral vision) are not displayed. Thus, while method 1000 refers to, e.g., positioning virtual objects and generating "visual" outputs, the actual visibility to the user of the virtual objects and outputs may differ depending on the particular, currently-displayed portion of the CGR environment. The terms "first time," "second time," "first portion," "second portion" and so forth are used to distinguish displayed virtual content from not-displayed virtual content, and are not intended to indicate a fixed order or predefined portion of the CGR environment.

In some embodiments, the CGR environment of method 1000 may include virtual and/or physical content (e.g., physical devices 910, 912, 914, or 916; the furniture or walls in the room where user 902 is located; and virtual objects 918A-C illustrated in FIGS. 2A-2E). The contents of the CGR environment may be static or dynamic. For example, static physical objects in the CGR environment may include physical furniture, walls and ceilings, or the like; while static virtual objects in the CGR environment may include virtual objects located at a consistent location within the CGR environment (e.g., virtual furniture, such as virtual objects 918A-C) or at a consistent location with respect to the display (e.g., a heads-up display overlaid on the displayed portion of the CGR environment). Dynamic physical objects in the CGR environment may include the user, other users, pets, or the like; while dynamic virtual items in the CGR environment include moving objects (e.g., virtual characters, avatars, or pets) or objects changing in size, shape, or form.

Referring now to FIG. 3A, at block 1002, a first user input is detected with one or more sensors of the device(s) implementing method 1000. For example, the one or more sensors may include audio sensors (e.g., a microphone), vibration sensors, movement sensors (e.g., accelerometers, cameras, and the like), visual sensors (e.g., light sensors, cameras, and the like), touch sensors, and so forth.

In some embodiments, the first user input includes an audio input. For example, the first user input may include a voice input including a trigger phrase (e.g., "Hey Assistant"). In some embodiments, the first user input includes a gaze input. For example, the user may direct their gaze at a particular location (e.g., a predefined digital assistant location, a location of a smart speaker or device), a location of an object that a digital assistant can help with, or the like) for at least a threshold period of time. In some embodiments, the first user input includes a gesture (e.g., user body movement) input. For example, the user may raise their wrist in a "raise-to-speak" gesture. In some embodiments, the first user inputs a button press, tap, controller, touchscreen, or device input. For example, the user may press and hold a touch screen of smart watch device 910.

At block 1004, in accordance with a determination that the first user input satisfies a criterion for initiating a digital assistant session, a digital assistant session is initiated.

For example, if the first user input includes an audio input, the criterion may include matching a predefined audio trigger (e.g., "Hey Assistant" or the like) with sufficient confidence. As another example, if the first user input includes a gaze input, the criterion may include the user directing their gaze at a particular location (e.g., a predefined digital assistant location, a location of an object the digital assistant can interact with, and so forth) for at least a threshold period of time. As another example, if the first user input includes a gesture (e.g., user body movement) input, the criterion may include matching a predefined gesture trigger (e.g., a "raise-wrist-to-speak" motion or the like) with sufficient confidence. One or more possible trigger inputs may be considered together or in isolation to determine whether the user has invoked a digital assistant session.

Initiating the digital assistant session at block 1004 includes positioning a digital assistant object at a first (e.g., initial) location within the CGR environment and outside of a first (e.g., currently-displayed) portion of the CGR environment at a first time. That is, the electronic device implementing block 1004 positions the digital assistant object within the CGR environment such that the digital assistant object is not visible to the user (e.g., not displayed, or "off-screen") at the time the digital assistant session is initiated.

In some embodiments, the first (e.g., initial) location within the CGR environment is a predetermined location within the CGR environment. For example, the predetermined location may be a predefined set of coordinates within a coordinate system of the CGR environment. The predetermined location may also have been defined (e.g., selected) by the user in a previous digital assistant session (e.g., as described below with respect to the second digital assistant session).

In some embodiments, at block 1006, the first (e.g., initial) location within the CGR environment is determined based on one or more environmental factors, such as the physical environment the user is operating within, the position of the user, or the positions of multiple users.

The one or more environmental factors may include a characteristic of the CGR environment. For example, the first location may be determined based on the physical location of electronic device (e.g., smart speaker device 912 of FIGS. 2A-2E), the static or dynamic location of another physical object (e.g., a piece of furniture or a pet running into the room), the static or dynamic location of a virtual object (e.g., virtual objects 918A-C of FIGS. 2A-2E), and/or the like. The location of an electronic device may be determined based on a pre-identified location (e.g., by a user manually identifying and tagging the device location), based on visual analysis of image sensor data (e.g., by analyzing image sensor data to recognize or visually understand a device), based on analysis of other sensor or connection data (e.g., using a Bluetooth connection for the general vicinity), or the like.

The one or more environmental factors may also include a position (e.g., a location and/or a pose) of a user. For example, the first location may be determined to be a location behind the user based on the way the user's body or head is facing or the position of the user's gaze. As another example, the first location may be determined to be a location on or near the user's body, such as positioning the orb at the user's wrist.

The one or more environmental factors may also include a plurality of positions (e.g., locations and/or poses) of a plurality of users of the CGR environment. For example, in a shared CGR environment, such as a virtual conference room or multiplayer game, the first location may be determined to be a location that minimizes (or maximizes) the visibility of the digital assistant object for a majority of the sharing users based on where each user is facing and/or gazing.

The digital assistant object is a virtual object that represents a digital assistant (e.g., an avatar for the digital assistant session). For example, the digital assistant object may be a virtual orb, a virtual character, a virtual ball of light, an avatar, and so forth. The digital assistant object may change appearance and/or form throughout the digital assistant session, for instance, morphing appearance from an orb into a virtual ball of light, from a semi-transparent orb to an opaque orb, and/or the like.

At block 1008, a first output indicating the first location of the digital assistant object within the CGR environment is provided. That is, although the first (e.g., initial) location is outside the first (e.g., currently-displayed) portion of the CGR environment, the first output indicating the first location helps the user to locate (e.g., find) the digital assistant object in the CGR environment, increasing the efficiency and effectiveness of the digital assistant session, e.g., by quickly and intuitively drawing the user's attention to the digital assistant session.

In some embodiments, providing the first output indicating the first location includes causing a first audio output to be produced. That is, the device(s) implementing method 1000 may produce the first audio output itself (e.g., using built-in speakers or a headset), and/or cause one or more other suitable audio devices to produce the first audio output. For example, the first audio output may include a spoken output (e.g., "Mhm?", "Yes?" "How may I help you?" and/or the like), another audio output (e.g., a chime, a hum, or the like), and/or a hybrid audio/haptic output (e.g., a hum resulting from a vibration also felt by the user).

In some embodiments, the first audio output may be provided using spatial sound techniques, such as using a plurality of speakers (e.g., a speaker array or surround-sound system) to emit a plurality of audio components (e.g., channels) at different volumes such that the overall audio output seems to specifically emit from a particular location. For example, the first audio output may include a first audio component (e.g., channel) produced by a first speaker of a plurality of speakers and a second audio component produced by a second speaker of a plurality of speakers. A determination is made whether the first location of the digital assistant object is closer to a location of a first speaker or the location of a second speaker. In accordance with a determination that the first location is closer to the location of the first speaker, the first audio component is produced at a louder volume than the second audio component. Likewise, in accordance with a determination that the first location is closer to the location of the second speaker, the second audio component is produced at a louder volume than the first audio component.

In some embodiments, providing the first output indicating the first location includes causing a first haptic output to be produced. That is, the device(s) implementing method 1000 may produce the first haptic output itself and/or cause one or more other suitable haptic devices to produce the first haptic output. Haptic outputs include vibrations, taps, and/or other tactile outputs felt by the user of the device(s) implementing method 1000. For example, as shown in FIG. 2B, device 910 is caused to produce a vibrational haptic output at the right wrist of user 902, indicating that the digital assistant object 920 is to the right of user 902.

In some embodiments, providing the first output indicating the first location includes displaying a visual indication of the first location. For example, the visual indication may include emitting virtual light from the first location, changing the pass-through filtering of physical environment lighting, and/or changing the lighting of the physical environment using appropriate home automation devices to directionally illuminate the CGR environment. As another example, the visual indication may include displaying an indicator other than the digital assistant object to direct the user to the first location.

In some embodiments, at block 1010, in accordance with a determination that the first location is within a second portion (e.g., a currently-displayed at a second time) of the CGR environment, the digital assistant object is displayed at the first location (e.g., on one or more displays of the device(s) implementing method 1000). That is, after initiating the first digital assistant session with the digital assistant object positioned off-screen (e.g., outside of the user's field-of-view at the time of initiation), when the user changes viewpoint (e.g., by looking in another direction or providing another input) to look at or near the location of the digital assistant object, the digital assistant object is made visible to the user.

In some embodiments, at block 1012, a second user input is detected (e.g., at a third time after the initiation of the first digital assistant session). For example, the second user input may include a spoken input, such as a spoken command, question, request, shortcut, or the like. As another example, the second user input may also include a gesture input, such as a signed command, question, request, or the like; a gesture representing an interaction with the CGR environment (e.g., "grabbing" and "dropping" a virtual object); or the like. As another example, the second user input may include a gaze input.

In some embodiments, at block 1014, an intent of the second user input is determined. An intent may correspond to one or more tasks that may be performed using one or more parameters. For example, if the second user input includes a spoken or signed command, question, or request, the intent may be determined using natural-language processing techniques, such as determining an intent to play audio from the spoken user input "Please play some music on the stereo" illustrated in FIG. 2C. As another example, if the second user input includes a gesture, the intent may be determined based on the type(s) of the gesture, the location(s) of the gesture and/or the locations of various objects within the CGR environment. For instance, a grab-and-drop type gesture may correspond to an intent to move a virtual object positioned at or near the location of the "grab" gesture to the location of the "drop" gesture.

In some embodiments, the determination of the intent of the second user input is only performed in accordance with a determination that the current location of the digital assistant object is within the currently-displayed portion of the CGR environment. That is, some detected user inputs may not be intended for the digital assistant session, such as a user speaking to another person in the physical room or another player in a multiplayer game. Only processing and responding to user inputs received while the user is looking at (or near) the digital assistant object improves the efficiency of the digital assistant session, for instance, by reducing the likelihood of an unintended interaction.

In some embodiments, at block 1016, a second output is provided based on the determined intent. Providing the second output may include causing one or more tasks corresponding to the determined intent to be performed. For example, as shown in FIGS. 2A-2E, for the spoken user input "Please play some music on the stereo", the second output includes causing stereo system 916 to play some music. As another example, for a signed input "What's the weather today?", the second output may include displaying a widget showing a thunderstorm icon and a temperature.

In some embodiments, providing the second output based on the determined intent includes determining whether the determined intent relates to repositioning the digital assistant object. For example, the second user input may include an explicit request to reposition the digital assistant, such as a spoken input "Go by the television" or a grab-and-drop gesture input. As another example, the second user input may include a gaze input originating at the current location of the digital assistant object in combination with a "pinch" or "grab" to initiate movement of the digital assistant object.

In accordance with a determination that the determined intent relates to repositioning the digital assistant object, a second location is determined from the second user input. For example, the second location "by the television" may be determined from the spoken input "Go by the television," a second location at or near the "drop" gesture may be determined from the grab-and-drop gesture input, or a second location at or near the location of a user's gaze may be determined from a gaze input.

Further in accordance with the determination that the determined intent relates to repositioning the digital assistant object, the digital assistant object is positioned at the second location. In accordance with a determination that the second location is within the currently-displayed (e.g., second) portion of the CGR environment (e.g., at a fourth time), the digital assistant object is displayed at the second location within the CGR environment. That is, while repositioning the digital assistant object from its location at the time the second user input is detected to the second location determined from the second user input, the digital assistant object is displayed as long as its location remains within the user's current field-of view (e.g., including animating the digital assistant object's movement from one location to another).

In some embodiments, providing the second output based on the determined intent includes determining whether the determined intent relates to an object (e.g., a physical or virtual object) located at an object location in the CGR environment. In accordance with a determination that the determined intent relates to an object located at an object location in the CGR environment, the digital assistant is positioned at a third location near the object location. That is, the digital assistant object will move closer to a relevant object to indicate an interaction with the object and/or draw attention to the object or interaction. For example, as shown in FIGS. 2A-2E, for the spoken user input "Please play some music on the stereo," digital assistant object 920 repositions closer to stereo system 916, as if digital assistant object 920 itself were turning on stereo system 916 and indicating to the user that the requested task involving the stereo has been performed.

In some embodiments, at block 1018, based on one or more characteristics of the second output, a third output is provided. The one or more characteristics of the second output may include a type of the second output (e.g., visual, audio, or haptic), a location of the second output within the CGR environment (e.g., for a task performed in the CGR environment), and so forth. For example, as shown in FIGS. 2A-2E, for the spoken user input "Please play some music on the stereo," the third output includes the spoken output "Ok, playing music." As another example, for a signed input "What's the weather today?", the third output may include animating the digital assistant object to bounce or wiggle near the displayed weather widget (e.g., the second output). By providing a third output as described, the efficiency of the digital assistant session is improved, for instance, by drawing the user's attention to the performance and/or completion of the requested task(s) when the performance and/or completion may not be immediately apparent to the user.

In some embodiments, at block 1020, a fifth output, selected from two or more different outputs, is provided, indicating a state of the first digital assistant session selected from two or more different states. The two or more different states of the first digital assistant session may include one or more listening states (e.g., active or passive listening), one or more responding states, one or more processing (e.g., thinking) states, one or more failure states, one or more attention-getting states, and/or one or more transitioning (e.g., moving, appearing, or disappearing) states. There may be a one-to-one correspondence between the different outputs and the different states, one or more states may be represented by the same output, or one or more outputs may represent the same state (or variations on the same state).

For example, as shown in FIGS. 2A-2E, digital assistant object 920 assumes a different appearance while initially getting the user's attention (e.g., indicating the initial location), listening to the user input, and responding to the user input/drawing the user's attention to the response. Other fifth (e.g., state) outputs may include changes to the size of the digital assistant object, movement animations, audio outputs (e.g., a directional voice output "originating" from the current location of the digital assistant object), changes in lighting effects, other visual outputs, haptic outputs, or the like.

At any point during the first digital assistant session, if currently-displayed portion of the CGR environment updates (e.g., in response to the user changing their point of view) such that the current location of the digital assistant object is no longer included in the currently-displayed portion (e.g., is no longer visible to the user), an additional output indicating the current position of the digital assistant may be provided. For example, the additional output indicating the current position may be provided as described with respect to block 1008 (e.g., a spatial audio output, a visual output, a haptic output, or the like).

In some embodiments, the first digital assistant session ends, for instance, upon explicit dismissal by the user or after a threshold period of time passes without an interaction. Upon ending the first digital assistant session, at block 1022, the digital assistant object is dismissed (e.g., removed from the CGR environment). If the digital assistant object is located within the displayed portion of the CGR environment at the time the digital assistant session ends, dismissing the digital assistant object includes ceasing to display the digital assistant object.

In some embodiments, upon dismissing the digital assistant object, a fourth output is provided indicating a dismissal of the digital assistant object. The fourth output may include one or more visual outputs (e.g., a faint glow, reverting lighting in the CGR environment to the state it was in prior to the digital assistant session, or the like), one or more audio outputs (e.g., a spoken output such as "Bye," a chime, or the like), one or more haptic outputs, and so forth. For example, as shown in FIG. 2E, providing the fourth output may include positioning digital assistant indicator 922 at the first location. The fourth output may indicate to the user that the first digital assistant session has ended and may help the user locate (e.g., find) the digital assistant object more quickly in subsequent invocations.

In some embodiments, after dismissing the digital assistant object, a third user input is detected. The third user input may be an audio input, gaze input, gesture input, or device input (e.g., button press, tap, swipe, etc.) as described with respect to the first user input (e.g., the user input invoking the first digital assistant session). In accordance with a determination that the third user input satisfies at least one criterion for initiating a digital assistant session (e.g., as described above with respect to block 1004), a second digital assistant session is initiated.

In some embodiments where a second user input relating to repositioning the digital assistant object was received during the first digital assistant session (e.g., as described above with respect to block 1016), initiating the second digital assistant session includes positioning the digital assistant object at the second location (e.g., the location requested with the second user input). That is, in some embodiments, after the user has explicitly moved the digital assistant object, the location chosen by the user becomes the new "default" location for the digital assistant object to appear upon subsequent invocations.

The method described above with reference to FIGS. 3A-3B is optionally implemented by components depicted in FIGS. 1A-1B and 2A-2E. For example, the operations of the illustrated method may be implemented by an electronic device (e.g., 800a, 800b, 800c, or 906). It would be clear to a person having ordinary skill in the art how other processes are implemented based on the components depicted in FIGS. 1A-1B and 2A-2E.

FIGS. 4A-4E illustrate a process (e.g., method 1200) for positioning a representation of a digital assistant within a CGR environment, according to various examples. The process is performed, for example, using one or more electronic devices implementing a digital assistant. In some examples, the process is performed using a client-server system, and the steps of the process are divided up in any manner between the server and a client device. In other examples, the steps of the process are divided up between the server and multiple client devices (e.g., a head mountable system (e.g., headset) and a smart watch). Thus, while portions of the process are described herein as being performed by particular devices of a client-server system, it will be appreciated that the process is not so limited. In other examples, the process is performed using only a client device (e.g., device 1106) or only multiple client devices. In the process, some steps are, optionally, combined, the order of some steps is, optionally, changed, and some steps are, optionally, omitted. In some examples, additional steps may be performed in combination with the illustrated process.

With reference to FIGS. 4A-4E, user 1102 is shown immersed in computer-generated reality (CGR) environment 1104 using device 1106 at various steps of the process. The right panels of FIGS. 4A-4E depict the corresponding currently displayed portion 1108 of CGR environment 1104 (e.g., the current field-of-view of user 1102) at the respective steps of the process, as displayed on one or more displays of device 1106. Device 1106 may be implemented as described above with respect to FIGS. 1A-1B and device 906 of FIGS. 2A-2E.

In some embodiments, CGR environment 1104 may contain mixed reality (MR) content, augmented reality (AR) content, virtual reality (VR) content, and/or the like. For example, as depicted in FIGS. 4A-4E, CGR environment 1104 contains MR content, allowing the user to view both physical objects and environments (e.g., physical devices 1110, 1112, 1114, or 1116; the furniture or walls in the room where user 1102 is located; or the like) and virtual objects 1118A-C (e.g., virtual furniture items including a chair, a picture frame, and a vase).

Figure 4A:
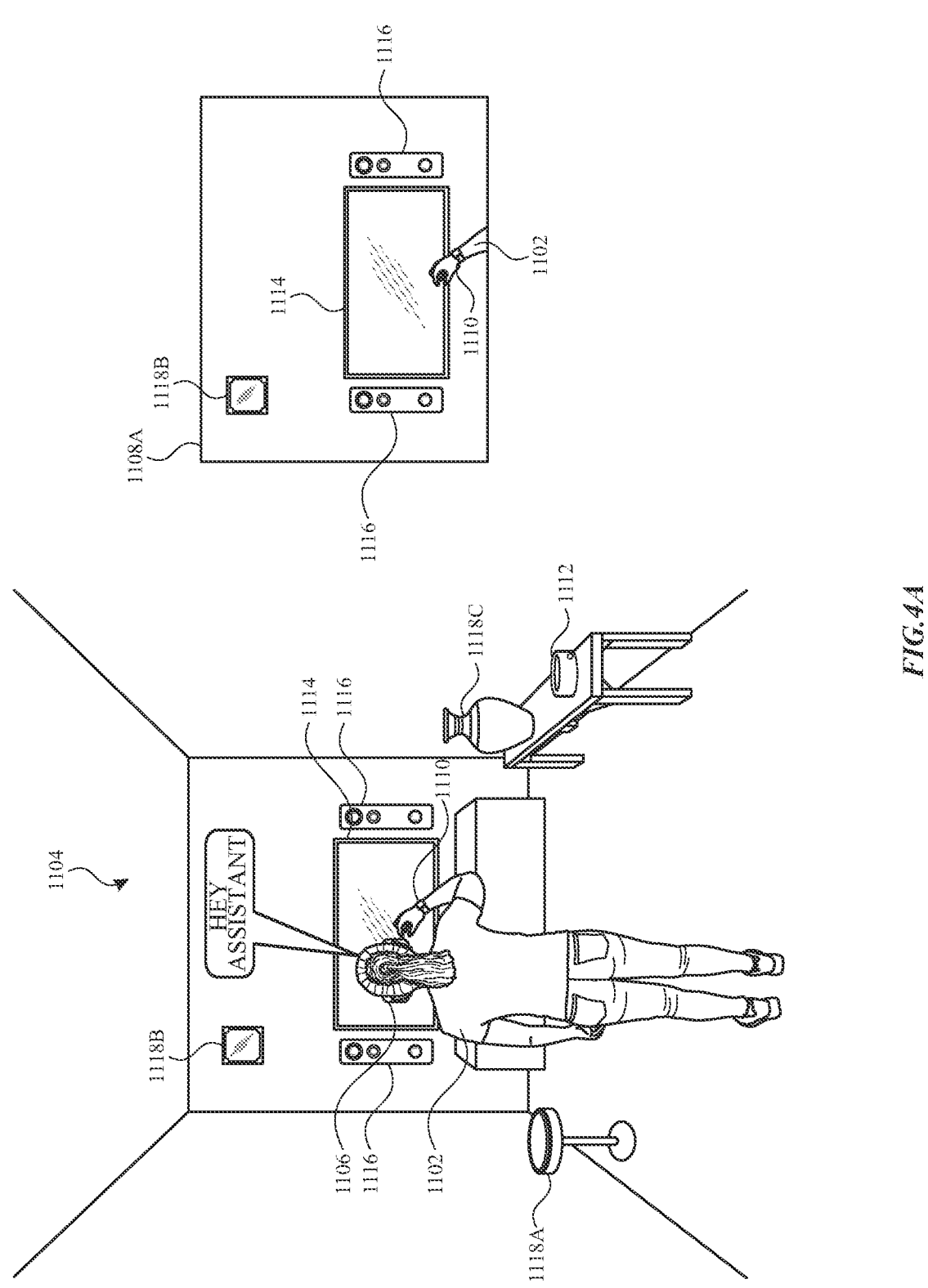
FIGS. 4A-4F illustrate a process for positioning a representation of a digital assistant within a CGR environment, according to various examples.

Referring now to FIG. 4A, device 1106 detects (e.g., using the one or more sensors), a user input. In currently displayed portion 1108A (e.g., user 902's current field-of-view while providing the user input), physical devices television 1114 and stereo system 1116 are visible, along with virtual object 1118B.

In some embodiments, the user input may include an audio input, such as a voice input including a trigger phrase; a gaze input, such as a user directing their gaze at a particular location for at least a threshold period of time; a gesture input; button press, tap, controller, touchscreen, or device input; and/or the like. For example, as shown in FIG. 4A, device 1106 detects user 1102 uttering "Hey Assistant." One or more possible trigger inputs may be considered together or in isolation to determine whether the user has invoked a digital assistant session.

Figure 4B:
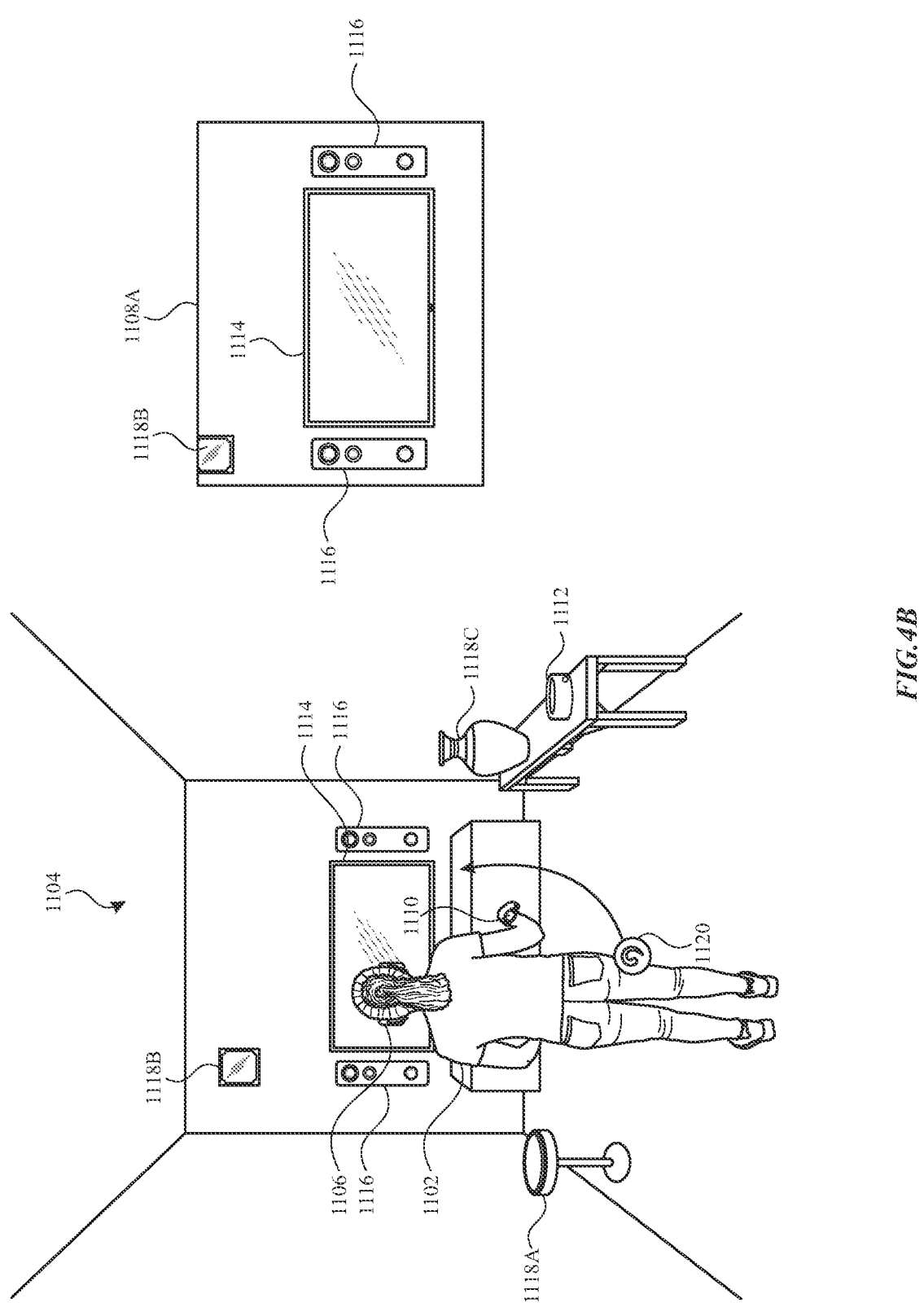

Referring now to FIG. 4B, in accordance with a determination that the user input satisfies one or more criteria for initiating a digital assistant session, a first digital assistant session is initiated. For example, as shown in FIG. 4B, the criteria for initiating a digital assistant session may include a criterion for matching a predefined audio trigger (e.g., "Hey Assistant"). Thus, when user 1102 utters the trigger phrase "Hey Assistant" as illustrated (as in FIG. 4A), the digital assistant session is initiated.

Initiating the first digital assistant session includes instantiating digital assistant object 1120 at a first location (e.g., first position) within CGR environment 1104. As shown in FIG. 4B, digital assistant object 1120 is a virtual (e.g., VR) orb located at a first location behind user 1102. The first position of digital assistant object 1120 is thus outside of (e.g., not visible within) currently displayed portion 1108B at the time the digital assistant session is initiated.

In some embodiments, the first location of digital assistant object 1120 may be determined based on one or more environmental factors, such as features of the physical environment; features of CGR environment 1104; the location, position, or pose of user 1102; the location, position, or pose of other possible users; and so forth. For example, as shown in FIG. 4B, the first location of digital assistant object 1120 is chosen to be a location user 1102 cannot currently see (e.g., a location outside of currently-displayed portion 1108B) based on where user 1102 is standing in the CGR environment and the direction user 1102 is looking.

In some embodiments, device 1106 may provide an output indicating a state of the digital assistant session. The state output may be selected from between two or more different outputs representing a state selected from two or more different states. For example, the two or more states may include a listening state, which may be further subdivided into active and passive listening states, a responding state, a thinking (e.g., processing) state, an attention-getting state, and so forth, which may be indicated by visual, audio, and/or haptic outputs. For example, as shown in FIG. 4B, the appearance of digital assistant object 1120 (e.g., the virtual orb) includes a swirl shape in the middle of the orb, indicating that the digital assistant object 1120 is in a listening state. As described with respect to FIGS. 2A-2E, as the state of the conversation progresses, an updated state output representing a different state may be provided.

Figure 4C:
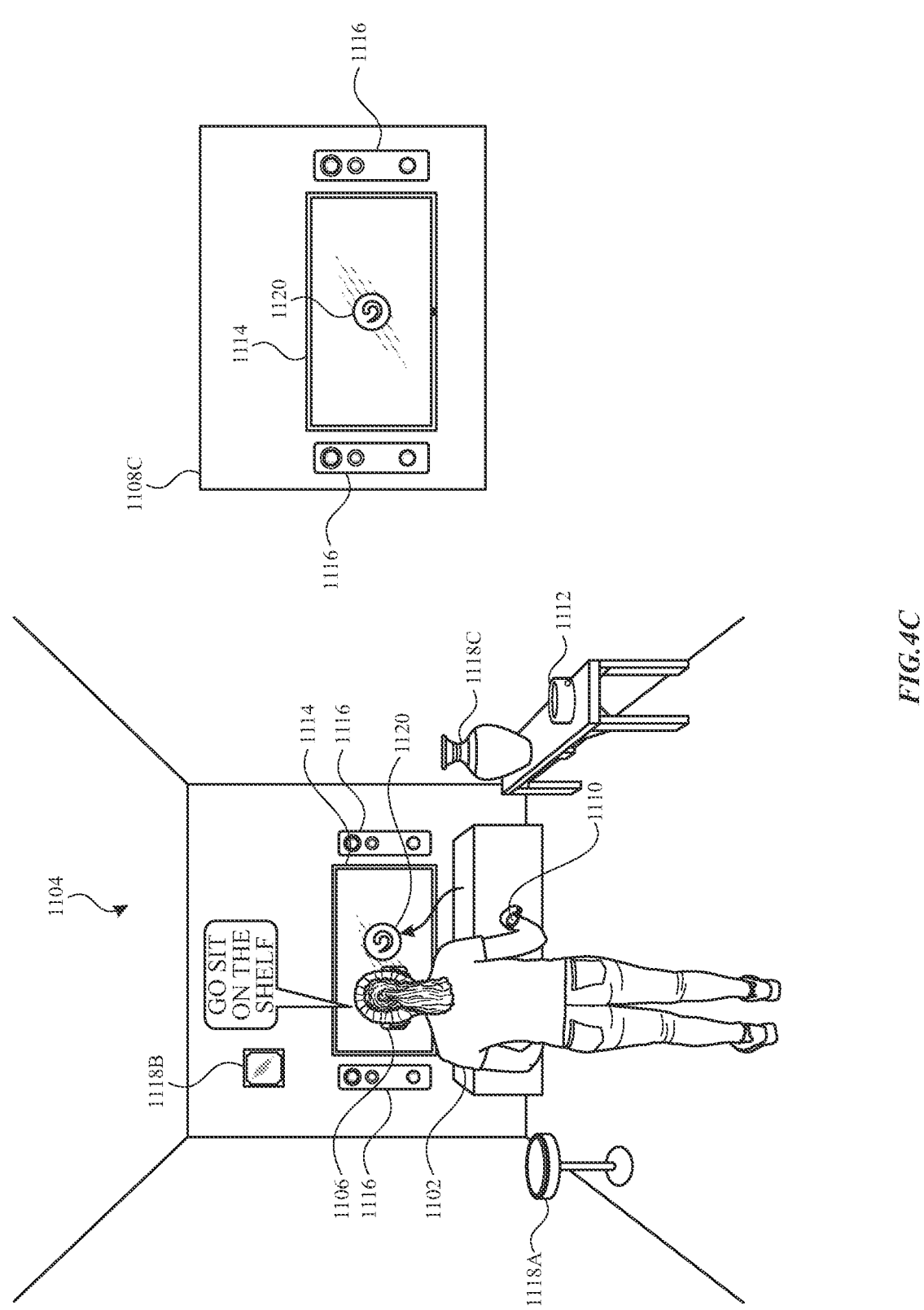

Referring now to FIGS. 4B-4C, initiating the first digital assistant session further includes animating digital assistant object 1120 repositioning to a second within currently-displayed portion 1108C. That is, digital assistant object 1120 moves through CGR environment 1104 to become visible to user 1102.

In some embodiments, animating the repositioning of digital assistant object 1120 includes determining a movement path representing a portion of a path between the first location and the second location that falls within currently-displayed portion 1108C. That is, as shown in FIG. 4C, digital assistant object 1120 is animated "flying into view" from the initial (e.g., first) location and coming to a stop at the final (e.g., second) location visible to user 1102.

In some embodiments, the movement path is determined in order to not pass through one or more objects located within currently-displayed portion(s) 1108B and 1108C of the CGR environment (e.g., physical or virtual objects). For example, as shown in FIG. 4C, the movement path does not intersect the (physical) furniture in the room where user 1102 is located or the virtual objects in CGR environment 1104 (e.g., virtual object 1118C), as though digital assistant object 1120 were "dodging" object in the CGR environment.

In some embodiments, the second location of digital assistant object 1120 may be determined based on one or more environmental factors, such as features of the physical environment; features of CGR environment 1104; the location, position, or pose of user 1102; the location, position, or pose of other possible users; and so forth. For example, as shown in FIG. 4C, the second location of digital assistant object 1120 is chosen to be visible to user 1102 (e.g., based on the position of user 1102) and to avoid collision (e.g., visual interference) with physical objects (such as television 1114) and/or virtual objects 1118 (such as virtual object 1118C).

Referring now to FIG. 4C, in some embodiments, device 1106 detects (e.g., using the one or more sensors), a second user input. Device 1106 then determines an intent of the second user input, for example, using natural-language processing methods. A response output is provided based on the determined intent. For example, as shown in FIG. 4C, device 1106 detects user 1102 speaking a request, "Go sit on the shelf," corresponding to an intent to reposition digital assistant object 1120.

Figure 4D:
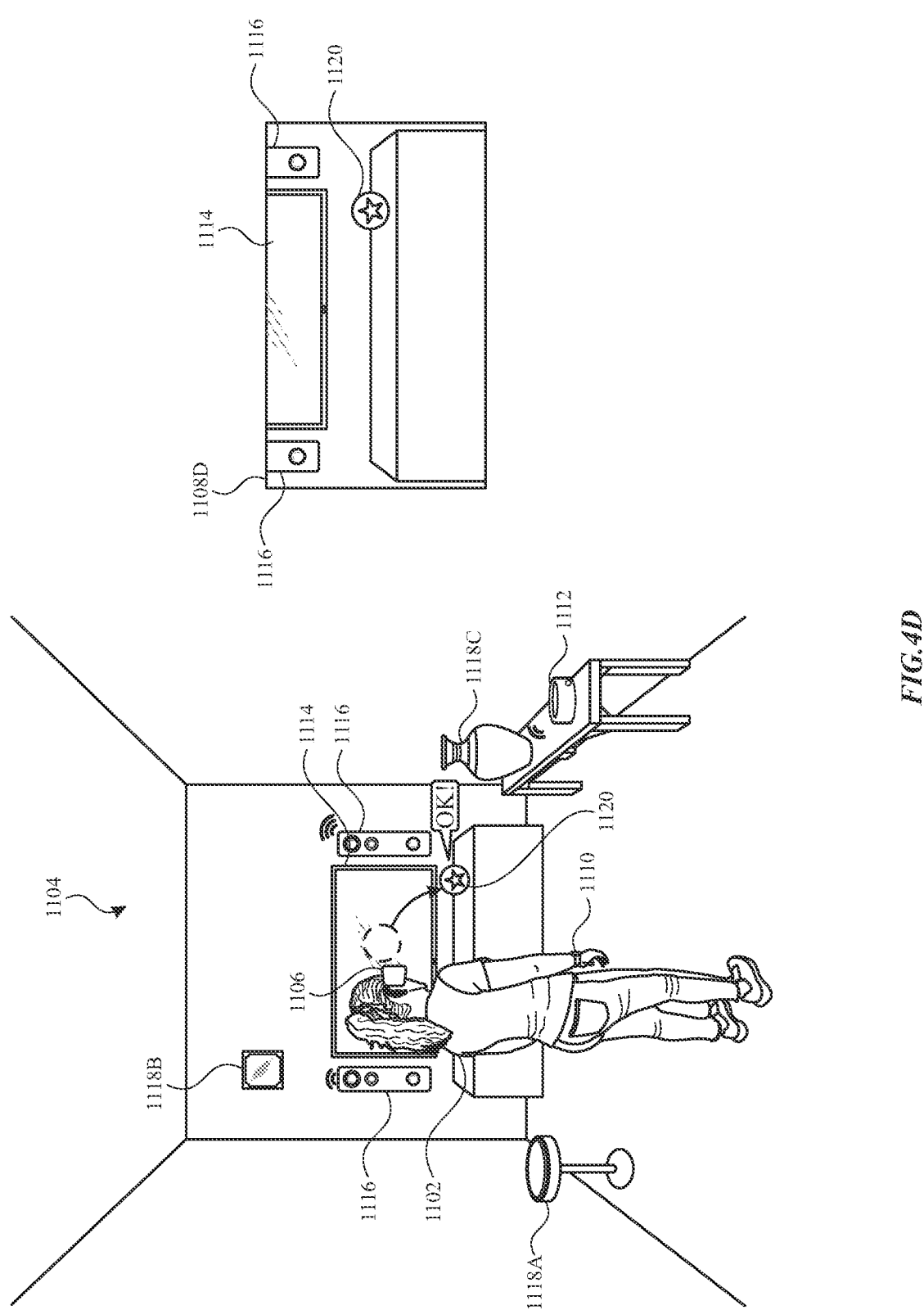

Referring now to FIG. 4D, in embodiments where the determined intent relates to repositioning digital intent object 1120, providing the response output includes determining a third location from the second user input. Digital assistant object 120 is then positioned at the third location, and, in accordance with a determination that the third location falls within currently-displayed portion 1108D, digital assistant object 1120 is displayed at the third location within CGR environment 1104.

For example, based on the user input shown in FIG. 4C, in FIG. 4D, the determined third location is a location on the (physical) shelf within CGR environment 1104, so digital assistant object 1120 repositions from the second location (directly in front of user 1102) to the third location on the shelf. As the shelf is within currently-displayed portion 1108, device 1106 displays digital assistant object 1120 "sitting" on the shelf.

Figure 4E:
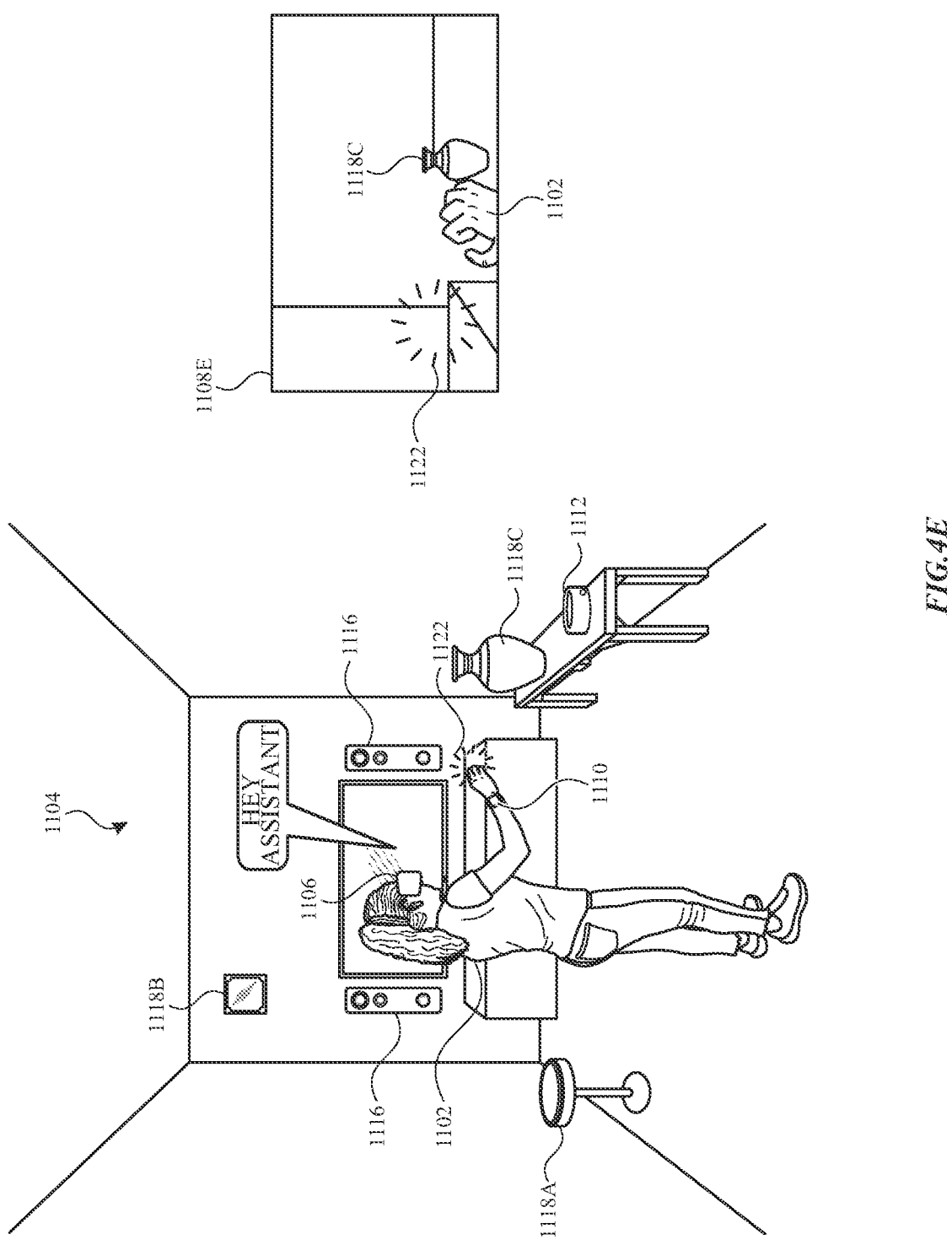

Referring now to FIG. 4E, in some embodiments, the digital assistant session may come to an end, for example, if user 1102 explicitly dismisses the digital assistant (e.g., using a voice input; gaze input; gesture input; button press, tap, controller, touchscreen, or device input; or the like), or automatically (e.g., after a predetermined threshold period of time without any interaction). When the digital assistant session ends, device 1106 dismisses digital assistant object 1120. If, as shown in FIG. 4E, the third location of the digital assistant object 1120 falls within currently-displayed portion 1108E (e.g., user 1102's current field-of-view at the time the digital assistant session ends), dismissing digital assistant object 1120 includes ceasing to display digital assistant object 1120.

In some embodiments, dismissing the digital assistant may also include providing a further output indicating the dismissal. The dismissal output may include indications such as an audio output (e.g., a chime, spoken output, or the like) or a visual output (e.g., a displayed object, changing the lighting of CGR environment 1104, or the like). For example, as shown in FIG. 4E, the dismissal output includes digital assistant indicator 1122, positioned at the first location (e.g., the initial location of digital assistant object 1120), thus indicating where digital assistant object 920 would reappear if another digital assistant session were initiated. As the third location is still within currently-displayed portion 1108E (e.g., user 1102's current field-of-view at a time after the first digital assistant session ends), device 1106 displays digital assistant indicator 1122.

In some embodiments, after dismissing digital assistant object 1120, device 1106 detects a third user input. For example, as shown in FIG. 4F, device 1106 detects user 1102 speaking the user input "Hey Assistant." As described above with respect to FIG. 4A, if the third input satisfies a criterion for initiating a digital assistant session (e.g., matching a predefined audio trigger, gaze trigger, or gesture trigger), a second digital assistant session is initiated.

Figure 4F:
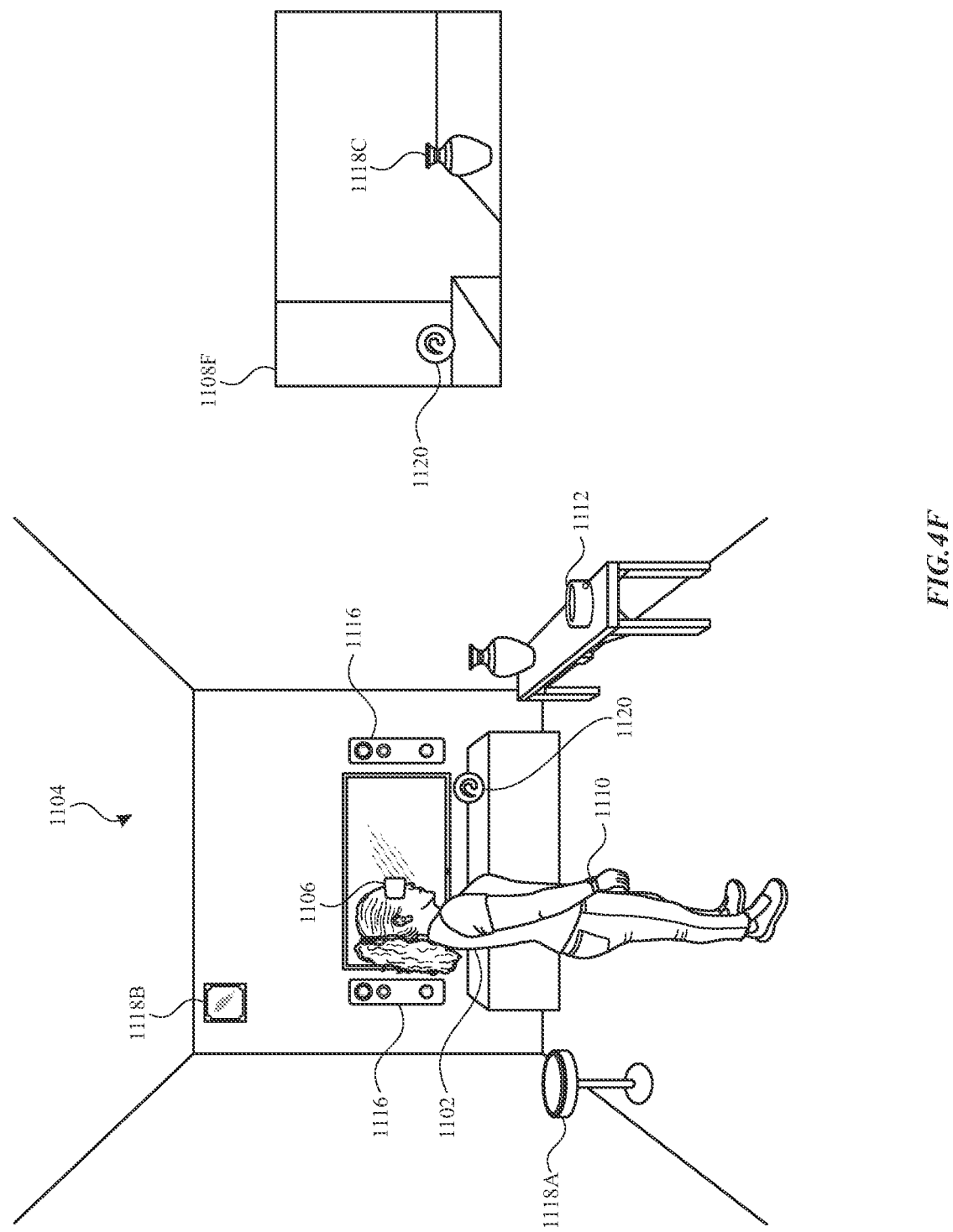

However, as shown in FIG. 4F, because user 1102 had previously repositioned digital assistant object 1120 to the shelf, initiating the second digital assistant session includes positioning digital assistant object at the third location. That is, in some embodiments, after manually repositioning digital assistant object 1120 during a digital assistant session, the default (e.g., initial) location for digital assistant object 1120 changes in accordance with user 1102's request.

The process described above with reference to FIGS. 4A-4F is optionally implemented by components depicted in FIGS. 1A-1B. For example, the operations of the illustrated process may be implemented by an electronic device (e.g., 800a, 800b, 800c, or 906). It would be clear to a person having ordinary skill in the art how other processes are implemented based on the components depicted in FIGS. 1A-1B.

FIGS. 5A-5B are a flow diagram illustrating method 1200 for positioning a representation of a digital assistant within a computer-generated reality (CGR) environment in accordance with some embodiments. Method 1200 may be performed using one or more electronic devices (e.g., devices 800a, 800b, 800c, and/or 1106) with one or more processors and memory. In some embodiments, method 1200 is performed using a client-server system, with the operations of method 1200 divided up in any manner between the client device(s) (e.g., 800c, 1106) and the server. Some operations in method 1200 are, optionally, combined, the orders of some operations are, optionally, changed, and some operations are, optionally, omitted.

Method 1200 is performed while displaying at least a portion of the CGR environment. That is, at a particular time, the particular portion of the CGR environment being displayed represents a current field-of-view of a user (e.g., the user of client device(s)), while other portions of the CGR environment (e.g., behind the user or outside of the user's peripheral vision) are not displayed. Thus, while method 1200 refers to, e.g., positioning virtual objects and generating "visual" outputs, the actual visibility to the user of the virtual objects and outputs may differ depending on the particular, currently-displayed portion of the CGR environment. The terms "first time," "second time," "first portion," "second portion" and so forth are used to distinguish displayed virtual content from not-displayed virtual content, and are not intended to indicate a fixed order or predefined portion of the CGR environment.

In some embodiments, the CGR environment of method 1200 may include virtual and/or physical content (e.g., physical devices 1110, 1112, 1114, or 1116; the furniture or walls in the room where user 1102 is located; and virtual objects 118A-C illustrated in FIGS. 4A-4F). The contents of the CGR environment may be static or dynamic. For example, static physical objects in the CGR environment may include physical furniture, walls and ceilings, or the like; while static virtual objects in the CGR environment may include virtual objects located at a consistent location within the CGR environment (e.g., virtual furniture, such as virtual objects 1118A-C) or at a consistent location with respect to the display (e.g., a heads-up display overlaid on the displayed portion of the CGR environment). Dynamic physical objects in the CGR environment may include the user, other users, pets, or the like; while dynamic virtual items in the CGR environment include moving objects (e.g., virtual characters, avatars, or pets) or objects changing in size, shape, or form.

Referring now to FIG. 5A, at block 1202, a first user input is detected with one or more sensors of the device(s) implementing method 1200. For example, the one or more sensors may include audio sensors (e.g., a microphone), vibration sensors, movement sensors (e.g., accelerometers, cameras, and the like), visual sensors (e.g., light sensors, cameras, and the like), touch sensors, and so forth.

In some embodiments, the first user input includes an audio input. For example, the first user input may include a voice input including a trigger phrase (e.g., "Hey Assistant"). In some embodiments, the first user input includes a gaze input. For example, the user may direct their gaze at a particular location (e.g., a predefined digital assistant location, a location of an object that a digital assistant can help with, or the like) for at least a threshold period of time. In some embodiments, the first user input includes a gesture (e.g., user body movement) input. For example, the user may raise their wrist in a "raise-to-speak" gesture. In some embodiments, the first user inputs a button press, tap, controller, touchscreen, or device input. For example, the user may press and hold a touch screen of smart watch device 910.

At block 1204, in accordance with a determination that the first user input satisfies a criterion for initiating a digital assistant session, a first digital assistant session is initiated.

For example, if the first user input includes an audio input, the criterion may include matching a predefined audio trigger (e.g., "Hey Assistant" or the like) with sufficient confidence. As another example, if the first user input includes a gaze input, the criterion may include the user directing their gaze at a particular location (e.g., a predefined digital assistant location, a location of an object the digital assistant can interact with, and so forth) for at least a threshold period of time. As another example, if the first user input includes a gesture (e.g., user body movement) input, the criterion may include matching a predefined gesture trigger (e.g., a "raise-wrist-to-speak" motion or the like) with sufficient confidence.

Initiating the digital assistant session at block 1204 includes, at block 1206, instantiating a digital assistant object at a first (e.g., initial) location within the CGR environment and outside of a first (e.g., currently-displayed) portion of the CGR environment at a first time. That is, the electronic device implementing block 1204 initially positions the digital assistant object within the CGR environment such that the digital assistant object is not visible to the user (e.g., not displayed, or "off-screen") at the time the digital assistant session is initiated.

In some embodiments, the first (e.g., initial) location within the CGR environment is a predetermined location within the CGR environment. For example, the predetermined location may be a predefined set of coordinates within a coordinate system of the CGR environment. The predetermined location may also have been defined (e.g., selected) by the user in a previous digital assistant session (e.g., as described below with respect to the second digital assistant session).

In some embodiments, at block 1208, the first (e.g., initial) location within the CGR environment is determined based on one or more first environmental factors, such as the physical environment the user is operating within, the position of the user, or the positions of multiple users. The one or more first environmental factors may include a characteristic of the CGR environment, for example, as described with respect to block 1006 of FIG. 3A, above. The one or more first environmental factors may also include a position (e.g., a location and/or a pose) of a user. For example, the first location may be determined to be a location behind the user based on the way the user's body or head is facing or the position of the user's gaze.

The digital assistant object is a virtual object that represents a digital assistant (e.g., an avatar for the digital assistant session). For example, the digital assistant object may be a virtual orb, a virtual character, a virtual ball of light, and so forth. The digital assistant object may change appearance and/or form throughout the digital assistant session, for instance, morphing appearance from an orb into a virtual ball of light, from a semi-transparent orb to an opaque orb, and/or the like.

At block 1210, the digital assistant object is animated repositioning to a second location within the first (e.g., currently-displayed) portion of the CGR environment at the first time. That is, although the first (e.g., initial) location is outside the first (e.g., currently-displayed) portion of the CGR environment, the digital assistant object quickly changes position to become visible to the user, increasing the efficiency and effectiveness of the digital assistant session, e.g., by quickly and intuitively drawing the user's attention to the digital assistant session without reducing immersion in the CGR environment.

In some embodiments, at block 1212, the second location is determined based on one or more second environmental factors, similarly to the determination of the first location at block 1208.

The one or more second environmental factors may include a characteristic of the CGR environment. For example, the second location may be determined based on the static or dynamic locations of physical or virtual objects within the CGR environment, for instance, such that the digital assistant object does not collide with (e.g., visually intersect) those other objects. For example, the second location may be determined to be at or near a location of an electronic device. The device location may be determined based on a pre-identified location (e.g., by a user manually identifying and tagging the device location), based on visual analysis of image sensor data (e.g., by analyzing image sensor data to recognize or visually understand a device), based on analysis of other sensor or connection data (e.g., using a Bluetooth connection for the general vicinity), or the like The one or more second environmental factors may also include a position (e.g., a location and/or a pose) of a user. For example, the first location may be determined to be a location in front of and/or visible to the user based on the way the user's body or head is facing or the position of the user's gaze.

In some embodiments, animating the digital assistant object repositioning to the second location within the first portion of the CGR environment includes animating the digital assistant object disappearing at the first location and reappearing at the second location (e.g., teleporting from one location to another location instantly or with some predefined delay).

In some embodiments, at block 1214, a movement path is determined. In some embodiments, the movement path represents the portion of a path between the first location and the second location that falls within the first (e.g., currently-displayed) portion of the CGR environment at the first time. That is, animating the digital assistant object repositioning to the second location includes determining the visible movements the digital assistant object should take to get to the second location. For example, the digital assistant object may simply take the shortest (e.g., most direct) path, or it may take a longer path that achieves a particular visible effect, such as a smooth "flight" path; a path with extraneous motion such as bouncing, bobbing, and weaving; and/or the like.

In some embodiments, the movement path is determined such that the movement path does not pass through at least one additional object located within the first (e.g., currently-displayed) portion of the CGR environment at the first time. For example, the digital assistant object movement path may be context-aware, moving to avoid or dodge other physical or virtual objects within the CGR environment. The digital assistant object may also be capable of dodging dynamic objects, such as a (real, physical) pet running into a room, another user of the CGR environment, or a moving virtual object (such as virtual objects 1118A-C in FIGS. 4A-4F).

In some embodiments, at block 1216, a second user input is detected (e.g., at some time after the initiation of the first digital assistant session). For example, the second user input may include a spoken input, such as a spoken command, question, request, shortcut, or the like. As another example, the second user input may also include a gesture input, such as a signed command, question, request, or the like; a gesture representing an interaction with the CGR environment (e.g., "grabbing" and "dropping" a virtual object); or the like. As another example, the second user input may include a gaze input.

In some embodiments, at block 1218, an intent of the second user input is determined. An intent may correspond to one or more tasks that may be performed using one or more parameters. For example, if the second user input includes a spoken or signed command, question, or request, the intent may be determined using natural-language processing techniques, such as determining an intent to play audio from the spoken user input "Go sit on the shelf" illustrated in FIG. 4C. As another example, if the second user input includes a gesture, the intent may be determined based on the type(s) of the gesture, the location(s) of the gesture and/or the locations of various objects within the CGR environment. For instance, a grab-and-drop type gesture may correspond to an intent to move a virtual object positioned at or near the location of the "grab" gesture to the location of the "drop" gesture.

In some embodiments, the determination of the intent of the second user input is only performed in accordance with a determination that the current location of the digital assistant object is within the currently-displayed portion of the CGR environment at the time the second user input is received. That is, some detected user inputs may not be intended for the digital assistant session, such as a user speaking to another person in the physical room or another player in a multiplayer game. Only processing and responding to user inputs received while the user is looking at (or near) the digital assistant object improves the efficiency of the digital assistant session, for instance, by reducing the likelihood of an unintended interaction.

In some embodiments, at block 1220, a first output is provided based on the determined intent. Providing the first output may include causing one or more tasks corresponding to the determined intent to be performed. For example, as shown in FIGS. 4A-4F, for the spoken user input "Go sit on the shelf", the second output includes repositioning digital assistant object 1120 to a shelf in the CGR environment. As another example, for a signed input "What time is it?", the first output may include displaying a widget showing a clock face.

In some embodiments, providing the second output based on the determined intent includes determining whether the determined intent relates to repositioning the digital assistant object. For example, the second user input may include an explicit request to reposition the digital assistant, such the spoken output "Go sit on the shelf" depicted in FIGS. 4A-4F or a grab-and-drop gesture input. As another example, the second user input may include a particular gaze input originating at the current location of the digital assistant object, moving across the displayed portion of the CGR environment, and stopping at a new location In accordance with a determination that the determined intent relates to repositioning the digital assistant object, a third location is determined from the second user input. For example, a third location "on the shelf" may be determined from the spoken input "Go sit on the shell," a third location at or near the "drop" gesture may be determined from the grab-and-drop gesture input, or a third location at or near the location of a user's gaze may be determined from a gaze input.

Further in accordance with the determination that the determined intent relates to repositioning the digital assistant object, the digital assistant object is positioned at the second location. In accordance with a determination that the third location is within the currently-displayed (e.g., second)

portion of the CGR environment (e.g., at a second time), the digital assistant object is displayed at the third location within the CGR environment. That is, while repositioning the digital assistant object from its location at the time the second user input is detected to the third location determined from the second user input, the digital assistant object is displayed as long as its location remains within the user's current field-of-view (e.g., including animating the digital assistant object's movement from one location to another).

In some embodiments, providing the first output based on the determined intent includes determining whether the determined intent relates to an object (e.g., a physical or virtual object) located at an object location in the CGR environment. In accordance with a determination that the determined intent relates to an object located at an object location in the CGR environment, the digital assistant is positioned at a fourth location near the object location. That is, the digital assistant object will move closer to a relevant object to indicate an interaction with the object and/or draw attention to the object or interaction. For example, in CGR environment 1104 shown in FIGS. 4A-4F, for a spoken user input such as "What's on the console table?," the digital assistant object 1120 may move to be near virtual object 1118C on the console table before providing more information about the virtual object.

In some embodiments, at block 1222, based on one or more characteristics of the first output, a second output is provided. The one or more characteristics of the second output may include a type of the second output (e.g., visual, audio, or haptic), a location of the second output within the CGR environment (e.g., for a task performed in the CGR environment), and so forth. For example, as shown in FIGS. 4A-4F, for the spoken user input "Go sit on the shelf," the second output may include the spoken output "Ok!" along with the actual movement to the shelf. As another example, for a signed input "What time is it?", the second output may include animating the digital assistant object to bounce or wiggle near the displayed clock widget (e.g., the first output). By providing a second output as described, the efficiency of the digital assistant session is improved, for instance, by drawing the user's attention to the performance and/or completion of the requested task(s) when the performance and/or completion may not be immediately apparent to the user.

In some embodiments, at block 1224, a fourth output, selected from two or more different outputs, is provided, indicating a state of the first digital assistant session selected from two or more different states. The two or more different states of the first digital assistant session may include one or more listening states (e.g., active or passive listening), one or more responding states, one or more processing (e.g., thinking) states, one or more failure states, one or more attention-getting states, and/or one or more transitioning (e.g., moving, appearing, or disappearing) states. There may be a one-to-one correspondence between the different outputs and the different states, one or more states may be represented by the same output, or one or more outputs may represent the same state (or variations on the same state).

For example, as shown in FIGS. 4A-4F, digital assistant object 1120 assumes a different appearance while initially getting the user's attention (e.g., moving into position at the second location) and responding to the user input/drawing the user's attention to the response. Other fourth (e.g., state) outputs may include changes to the size of the digital assistant object, movement animations, audio outputs (e.g., a directional voice output "originating" from the current location of the digital assistant object), changes in lighting effects, other visual outputs, haptic outputs, or the like.

At any point during the first digital assistant session, if currently-displayed portion of the CGR environment updates (e.g., in response to the user changing their point of view) such that the current location of the digital assistant object is no longer included in the currently-displayed portion (e.g., is no longer visible to the user), an output indicating the current position of the digital assistant may be provided. For example, the additional output indicating the current position may be provided as described above with respect to FIGS. 3A-3B and block 1008 (e.g., a spatial audio output, a visual output, a haptic output, or the like).

In some embodiments, the first digital assistant session ends, for instance, upon explicit dismissal by the user or after a threshold period of time passes without an interaction. Upon ending the first digital assistant session, at block 1226, the digital assistant object is dismissed (e.g., removed from the CGR environment). If the digital assistant object is located within the displayed portion of the CGR environment at the time the digital assistant session ends, dismissing the digital assistant object includes ceasing to display the digital assistant object.

In some embodiments, upon dismissing the digital assistant object, a third output is provided indicating a dismissal of the digital assistant object. The third output may include one or more visual outputs (e.g., a faint glow, reverting lighting in the CGR environment to the state it was in prior to the digital assistant session, or the like), one or more audio outputs (e.g., a spoken output such as "Bye," a chime, or the like), one or more haptic outputs, and so forth. For example, as shown in FIG. 4E, providing the third output may include positioning digital assistant indicator 1122 at the third location. The third output may indicate to the user that the first digital assistant session has ended and may help the user locate (e.g., find) the digital assistant object more quickly in subsequent invocations.

In some embodiments, after dismissing the digital assistant object, a third user input is detected. The third user input may be an audio input, gaze input, gesture input, or device input (e.g., button press, tap, swipe, etc.), as described with respect to the first user input (e.g., the user input invoking the first digital assistant session). In accordance with a determination that the third user input satisfies at least one criterion for initiating a digital assistant session (e.g., as described above with respect to block 1204), a second digital assistant session is initiated.

In embodiments where a second user input relating to repositioning the digital assistant object was received during the first digital assistant session, initiating the second digital assistant session includes positioning (e.g., instantiating) the digital assistant object at the third location (e.g., the location requested with the second user input). That is, as illustrated in FIGS. 4A-4F, after the user has explicitly moved the digital assistant object, the location chosen by the user becomes the new "default" location for the digital assistant object to appear upon subsequent invocations.

The method described above with reference to FIGS. 5A-5B is optionally implemented by components depicted in FIGS. 1A-1B. For example, the operations of the illustrated method may be implemented by an electronic device (e.g., 800a, 800b, 800c, or 906), such as one implementing system 700. It would be clear to a person having ordinary skill in the art how other processes are implemented based on the components depicted in FIGS. 1A-1B.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
a display;
one or more sensors;
one or more processors;
a memory; and
one or more programs, wherein the one or more programs are stored in the memory and configured to be executed by the one or more processors, the one or more programs including instructions for:
while displaying a portion of a computer-generated reality (CGR) environment representing a current field of view of a user of the electronic device:
detecting, with the one or more sensors, a first user input;
in accordance with a determination that the first user input satisfies at least one criterion for initiating a digital assistant session, initiating a first digital assistant session, wherein initiating the first digital assistant session includes positioning a digital assistant object at a first location within the CGR environment and outside of the displayed portion of the CGR environment at a first time; and
providing a first output indicating the first location of the digital assistant object within the CGR environment.

2. The electronic device of claim 1, wherein the first user input includes an audio input.

3. The electronic device of claim 1, wherein the first user input includes a gaze input.

4. The electronic device of claim 1, wherein the first user input includes a gesture input.

5. The electronic device of claim 1, the one or more programs further including instructions for:
determining the first location within the CGR environment based on one or more environmental factors.

6. The electronic device of claim 1, wherein providing the first output indicating the first location includes causing a first audio output to be produced.

7. The electronic device of claim 1, wherein providing the first output indicating the first location includes causing a first haptic output to be produced.

8. The electronic device of claim 1, wherein providing the first output indicating the first location includes displaying, on the display, a visual indication of the first location.

9. The electronic device of claim 1, the one or more programs further including instructions for:
at a second time:
in accordance with a determination that the first location is within the displayed portion of the CGR environment at the second time, displaying the digital assistant object at the first location.

10. The electronic device of claim 1, the one or more programs further including instructions for:
detecting, with the one or more sensors, a second user input at a third time;
determining an intent of the second user input; and
providing a second output based on the determined intent.

11. The electronic device of claim 1, the one or more programs further including instructions for:
dismissing the digital assistant object; and
providing a fourth output indicating a dismissal of the digital assistant object.

12. The electronic device of claim 1, the one or more programs further including instructions for:
providing a fifth output selected from two or more different outputs indicating a state selected from two or more different states of the first digital assistant session.

13. A non-transitory computer-readable storage medium storing one or more programs, the one or more programs comprising instructions, which when executed by one or more processors of an electronic device with a display and one or more sensors, cause the electronic device to:
while displaying a portion of a computer-generated reality (CGR) environment representing a current field of view of a user of the electronic device:
detecting, with the one or more sensors, a first user input;
in accordance with a determination that the first user input satisfies at least one criterion for initiating a digital assistant session, initiating a first digital assistant session, wherein initiating the first digital assistant session includes positioning a digital assistant object at a first location within the CGR environment and outside of the displayed portion of the CGR environment at a first time; and
providing a first output indicating the first location of the digital assistant object within the CGR environment.

14. The non-transitory computer-readable storage medium of claim 13, wherein the first user input includes an audio input.

15. The non-transitory computer-readable storage medium of claim 13, wherein the first user input includes a gaze input.

16. The non-transitory computer-readable storage medium of claim 13, wherein the first user input includes a gesture input.

17. The non-transitory computer-readable storage medium of claim 13, the one or more programs further including instructions for:
determining the first location within the CGR environment based on one or more environmental factors.

18. The non-transitory computer-readable storage medium of claim 13, wherein providing the first output indicating the first location includes causing a first audio output to be produced.

19. The non-transitory computer-readable storage medium of claim 13, wherein providing the first output indicating the first location includes causing a first haptic output to be produced.

20. The non-transitory computer-readable storage medium of claim 13, wherein providing the first output indicating the first location includes displaying, on the display, a visual indication of the first location.

21. The non-transitory computer-readable storage medium of claim 13, the one or more programs further including instructions for:
at a second time:
in accordance with a determination that the first location is within the displayed portion of the CGR environment at the second time, displaying the digital assistant object at the first location.

22. The non-transitory computer-readable storage medium of claim 13, the one or more programs further including instructions for:
detecting, with the one or more sensors, a second user input at a third time;
determining an intent of the second user input; and
providing a second output based on the determined intent.

23. The non-transitory computer-readable storage medium of claim 13, the one or more programs further including instructions for:
dismissing the digital assistant object; and
providing a fourth output indicating a dismissal of the digital assistant object.

24. The non-transitory computer-readable storage medium of claim 13, the one or more programs further including instructions for:
providing a fifth output selected from two or more different outputs indicating a state selected from two or more different states of the first digital assistant session.

25. A method, comprising:
at an electronic device with one or more processors, memory, a display, and one or more sensors:
while displaying a portion of a computer-generated reality (CGR) environment representing a current field of view of a user of the electronic device:
detecting, with the one or more sensors, a first user input;
in accordance with a determination that the first user input satisfies at least one criterion for initiating a digital assistant session, initiating a first digital assistant session, wherein initiating the first digital assistant session includes positioning a digital assistant object at a first location within the CGR environment and outside of the displayed portion of the CGR environment at a first time; and
providing a first output indicating the first location of the digital assistant object within the CGR environment.

26. The method of claim 25, wherein the first user input includes an audio input.

27. The method of claim 25, wherein the first user input includes a gaze input.

28. The method of claim 25, wherein the first user input includes a gesture input.

29. The method of claim 25, further comprising:

determining the first location within the CGR environment based on one or more environmental factors.

30. The method of claim 25, wherein providing the first output indicating the first location includes causing a first audio output to be produced.

31. The method of claim 25, wherein providing the first output indicating the first location includes causing a first haptic output to be produced.

32. The method of claim 25, wherein providing the first output indicating the first location includes displaying, on the display, a visual indication of the first location.

33. The method of claim 25, further comprising:
at a second time:
in accordance with a determination that the first location is within the displayed portion of the CGR environment at the second time, displaying the digital assistant object at the first location.

34. The method of claim 25, further comprising:
detecting, with the one or more sensors, a second user input at a third time;
determining an intent of the second user input; and
providing a second output based on the determined intent.

35. The method of claim 25, further comprising:
dismissing the digital assistant object; and
providing a fourth output indicating a dismissal of the digital assistant object.

36. The method of claim 25, further comprising:
providing a fifth output selected from two or more different outputs indicating a state selected from two or more different states of the first digital assistant session.

* * * * *